United States Patent
Reap

(10) Patent No.: US 11,654,993 B1
(45) Date of Patent: May 23, 2023

(54) MODULAR CARRIER FOR BICYCLE, WITH SPECIALIZED ACCESSORY RACKS

(71) Applicant: Frank Reap, Golden, CO (US)

(72) Inventor: Frank Reap, Golden, CO (US)

( * ) Notice: Subject to any disclaimer, the term of this patent is extended or adjusted under 35 U.S.C. 154(b) by 0 days.

(21) Appl. No.: 17/548,160

(22) Filed: Dec. 10, 2021

(51) Int. Cl.
*B62J 7/02* (2006.01)
*B62J 11/00* (2020.01)
*B62J 11/05* (2020.01)

(52) U.S. Cl.
CPC ................. *B62J 7/02* (2013.01); *B62J 11/00* (2013.01); *B62J 11/05* (2020.02)

(58) Field of Classification Search
CPC ......... B62J 7/04; B62J 9/23; B62J 9/27; B62J 11/00; B62J 11/05
USPC ......................................................... 224/427
See application file for complete search history.

(56) References Cited

U.S. PATENT DOCUMENTS

| | | | | |
|---|---|---|---|---|
| 8,720,760 | B1 * | 5/2014 | Simpson ................. | B62D 43/02 224/532 |
| 9,333,822 | B1 * | 5/2016 | LaFave ..................... | B60R 9/06 |
| 10,093,375 | B1 * | 10/2018 | Cheng ......................... | B62J 9/23 |
| 10,351,196 | B2 * | 7/2019 | Bain ......................... | B62J 11/00 |
| 2002/0096858 | A1 * | 7/2002 | Shaw ......................... | B62H 7/00 280/288.4 |
| 2009/0250496 | A1 * | 10/2009 | Freyberger ............... | B62J 11/05 224/427 |
| 2013/0284782 | A1 * | 10/2013 | Brown ....................... | B62J 9/23 224/427 |
| 2015/0028073 | A1 * | 1/2015 | Williams ................... | B62J 7/04 224/407 |
| 2021/0387688 | A1 * | 12/2021 | Seguin ....................... | B62J 7/04 |

* cited by examiner

*Primary Examiner* — Corey N Skurdal
(74) *Attorney, Agent, or Firm* — Barber Legal; Craig W. Barber

(57) ABSTRACT

A sporting equipment carrier for mounting onto a bicycle, the carrier being able to be customized as needed to a variety of different sporting equipment despite the wildly disparate sizes and shapes of different types of equipment for different sports. A core support which attaches to the seat post of the bicycle by means of a clamp, and has members so it projects backward away from the seat over the rear wheel of the bicycle. One or more mating arms and diverse attachment points allow the connection of equipment holders on one or more sides of the rear wheel. The holders are for different types of sporting equipment: skis, snow boards, surf boards, skates, skate boards, baskets for smaller items having apertures through the sides for long smaller items, etc. The equipment holders may be easily removed and replaced with another holder.

13 Claims, 47 Drawing Sheets

MODULAR CARRIER FOR BICYCLE, WITH SPECIALIZED ACCESSORY RACKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but reserves all copyright rights whatsoever. 37 CFR 1.71(d).

CROSS-REFERENCE TO RELATED APPLICATIONS

N/A

FIELD OF THE INVENTION

This invention relates generally to bicycles and specifically to bicycle cargo racks.

STATEMENT REGARDING FEDERALLY FUNDED RESEARCH

This invention was not made under contract with an agency of the US Government, nor by any agency of the US Government.

BACKGROUND OF THE INVENTION

Bicycles' utility as transportation is somewhat limited by their lightness and small size: they are fundamentally most efficient for a rider hauling only a light and small load.

Bicycle baskets are the most common way to haul loads on a bicycle. Bike baskets tend to be about one foot (about 30 cm) in their longest dimension and light in construction. They work well for small items only, with larger items forced to stick out and up into the air at an odd angle. An example of the limitations of bicycle baskets can created by the exercise of simply imagining a bike basket with a pair of cross-country skis sticking up out of it.

A better method of hauling larger articles on a bike is the bike cargo rack, usually a flat wire platform projecting over the front or rear wheel. If the user has a means of securing a longer item to the cargo rack larger items can be carried cross-wise. Elastic cords or spring-loaded clips are means for securing larger items to a bicycle cargo rack, projecting out to the sides. However, to repeat the exercise above, imagining a pair of cross-country skis (usually 110% to 120% of the height of the skier, for example, a skier of 5' 6" height (145 cm) would have cross-country skis usually ranging from 160 cm to 175 cm (six feet long or longer). This would leave three feet of ski cantilevered on either side of the bike centerline. In this case, it would be necessary to tie the skies down very securely in order to ride with skis on the back of the bike, and there might not be a place for ski boots and other accessories.

There are custom ski carriers available for bicycles, but at rather high cost.

Cross-country skis are chosen as an example merely because they have a distinctive and extreme shape: very long, narrow, and paired. However, the same problem applies to other sporting equipment, if not quite as strongly. Downhill skis are shorter and wider but still a problem, a snow board, surf board, skate board, beach chair, beach umbrella, in-line skates, lacrosse sticks, hockey sticks and so forth all are less extreme examples of this same problem. These numerous sports are usually more popular than cross-country skiing: the number of snow boarders is much larger, the number of skate boarders even larger, and so forth.

The cost of providing custom cargo solutions to carrying each different type of equipment on the back of a bike would be prohibitive for anyone who engaged in more than one or two sports.

It would be preferable to provide a low-cost, game-changing, flexible, and very secure system for carriage of sporting and outdoor equipment on bicycles.

It would further be preferable to provide such a system with modular components to allow for different types of equipment to be easily carried.

It would yet further be preferable to provide such a system with low cost construction allowing easy manufacture.

It would even further be preferable to provide a system having an easy method of switching from one type of modular equipment carrier to another different type of modular carrier for a different type of equipment easily and quickly.

It would yet further be preferable if the system included at least a basket, basket able to hold long narrow objects side to side or front to back, a beach chair carrier rack, a snow board carrier rack, a surf board carrier rack, a ski carrier rack.

SUMMARY OF THE INVENTION

General Summary

The present invention teaches a sporting equipment carrier for mounting onto a bicycle, the carrier being able to be customized as needed to a variety of different sporting equipment despite the wildly disparate sizes and shapes of different types of equipment for different sports: skis, beach chairs, roller blades, surf boards versus snow boards, cross country skate boards versus normal sized boards versus penny boards and so forth.

The invention has a core support which attaches to the seat post of the bicycle by means of a clamp, and has at least two members, one angled, allowing the core support to project backward away from the seat and over the rear wheel of the bicycle. At the distal end of the core support, one or more mating arms of one or more sizes, along with diverse attachment points, allow the connection of various specialized equipment holders on one or more sides of the rear wheel: left, right, above, or behind.

The holders are for different types of sporting equipment. For example, a pair of skis, a snow board, and a surf board are all conceptually similar but a support designed for one type of equipment will either not secure another type or will not be usable at all. Thus different sizes and arrangements of equipment holders are necessary.

Equipment holders include at least snow board holders, surf board holders, skate board holders for larger boards such as cross country skate boards, ski holders, a basket for smaller items having high sides to serve as a tray and further having apertures through the sides and front or back to hold long narrow items (paddles, bats, sticks and so forth).

The equipment holders may be easily removed and replaced with another holder. A mating arm has a set size and cross-section, which mechanically engages to a mating tube on the holder, the mating tube having a size and cross-section which provide the mechanical engagement. One preferred embodiment and best mode presently contemplated, an example, is a square arm and a square tube, the inner diameter of the square tube matching the outer diameter of the square arm.

Another device for securing holders is a set of apertures passing through the holder and the core support and allowing fasteners such as pins, bolts, lugs and so forth to pass through both. Yet another securing device is having lugs built into the holder or the core support so that the lugs of one pass through the apertures of the other.

Summary in Reference to Claims

It is therefore another aspect, advantage, objective and embodiment of the invention, in addition to those discussed previously, to provide a bicycle carrier attachment used for carrying sporting equipment, the bicycle carrier attachment for attachment to a bicycle seat post, the bicycle carrier attachment comprising:

a central core support, the central core support comprising:

a tubular clamp having an aperture, the aperture having an inner diameter dimensioned and configured to encircle and attach to such bicycle seat post, the clamp having a slot dimensioned and configured to mechanically engage to part of such bicycle seat post;

a first angled central support section projecting at a first end from the tubular clamp at an angle to the tubular clamp;

a second central support section projecting from a second end of the first angled central support section;

first and second mating arms projecting from the second central support section, the first mating arm having a first arm bottom aperture and the second mating arm having a second arm bottom aperture, the first arm having a first arm step, the first arm step creating a first arm cross-section at a first arm end, the second arm having a second arm step, the second arm step creating a second arm cross-section at a second arm end.

It is therefore another aspect, advantage, objective and embodiment of the invention, in addition to those discussed previously, to provide a bicycle carrier attachment further comprising:

the first angled central support section and the second central support section being constructed of a tubing having a square cross-section;

the first and second mating arms also being constructed of the tubing having a square cross-section.

It is therefore another aspect, advantage, objective and embodiment of the invention, in addition to those discussed previously, to provide a bicycle carrier attachment further comprising:

a top support running along a top surface of the first angled central support section and the second central support section, the top support being flat, the top support further partially running along the first and second mating arms and forming the first and second arm steps.

It is therefore another aspect, advantage, objective and embodiment of the invention, in addition to those discussed previously, to provide a bicycle carrier attachment further comprising:

first and second securing apertures passing vertically through the top support and the second central support section.

It is therefore another aspect, advantage, objective and embodiment of the invention, in addition to those discussed previously, to provide a bicycle carrier attachment further comprising:

a basket removably attached to the second central support section, the basket having a basket bottom;

the basket bottom having first and second basket securing apertures dimensioned and configured to align with the first and second securing apertures of the top support and the second central support section.

It is therefore another aspect, advantage, objective and embodiment of the invention, in addition to those discussed previously, to provide a bicycle carrier attachment further comprising:

an elongated planform such that the basket bottom is rectangular;

first and second tray walls extending upward from first and second opposite sides of the rectangular basket bottom;

first and second elongated apertures through the respective first and second tray walls;

third and fourth tray walls extending upward from third and fourth opposite sides of the rectangular basket bottom;

third and fourth apertures through the respective third and fourth tray walls; and an open top.

It is therefore another aspect, advantage, objective and embodiment of the invention, in addition to those discussed previously, to provide a bicycle carrier attachment further comprising:

a third mating arm projecting from the second central support section, also being constructed of the tubing having a square cross-section, the top support running along the third mating arm to a third mating arm end, but the third mating arm having no step, whereby the combination of the top support and the square cross-section causes the third mating arm to have third mating arm cross-section which is different from the first and second mating arm cross-sections.

It is therefore another aspect, advantage, objective and embodiment of the invention, in addition to those discussed previously, to provide a bicycle carrier attachment further comprising:

a snow board holder having a mating tube, the mating tube having a square-cross section dimensioned and configured to slide onto the first or second mating arm, whereby the snow board holder may be attached to the central core support;

the snow board holder having a vertical member having upper and lower ends, the mating tube projecting from the vertical member;

first and second upper arms projecting from the vertical member upper end, the first and second upper arms each having an upper arm inner section and an upper arm outer section;

the upper arm inner sections having a first curvature which transitions the upper arm inner sections to the vertical member;

third and fourth lower arms projecting from the vertical member lower end, the third and fourth lower arms each having a lower arm inner section and a lower arm outer section;

the lower arm inner sections having a second curvature which transitions the lower arm inner sections to the vertical member.

It is therefore another aspect, advantage, objective and embodiment of the invention, in addition to those discussed previously, to provide a bicycle carrier attachment further comprising:

a plurality of elongated slots.

It is therefore another aspect, advantage, objective and embodiment of the invention, in addition to those discussed previously, to provide a bicycle carrier attachment further comprising:

the lower arm outer sections having an angle above the horizontal, such that the second curvature of the lower arm inner sections and the angle above the horizontal of the lower arm outer sections cooperate to form a board edge valley.

It is therefore another aspect, advantage, objective and embodiment of the invention, in addition to those discussed previously, to provide a bicycle carrier attachment further comprising:

a ski holder having a mating tube, the mating tube having a square-cross section dimensioned and configured to slide onto the first or second mating arm, whereby the ski holder may be attached to the central core support;

the ski holder having a vertical member having upper and lower ends, the mating tube projecting from the vertical member;

first and second upper arms projecting from the vertical member upper end, the first and second upper arms each having an upper arm inner section and an upper arm outer section;

third and fourth lower arms projecting from the vertical member lower end, the third and fourth lower arms each having a lower arm inner section and a lower arm outer section;

the four outer arm sections having an angle above the horizontal;

the four arms dimensioned and configured to support a pair of skis.

It is therefore another aspect, advantage, objective and embodiment of the invention, in addition to those discussed previously, to provide a bicycle carrier attachment further comprising:

a surf board holder having a mating tube, the mating tube having a square-cross section dimensioned and configured to slide onto the first or second mating arm, whereby the surf board holder may be attached to the central core support;

the surf board holder having a vertical member having upper and lower ends, the mating tube projecting from the vertical member;

first and second upper arms projecting from the vertical member upper end, the first and second upper arms each having an upper arm inner section and an upper arm outer section;

the upper arm inner sections having a first curvature which transitions the upper arm inner sections to the vertical member;

a U-shaped lower support projecting from the lower end of the vertical member, the U-shaped lower support being horizontal.

It is therefore another aspect, advantage, objective and embodiment of the invention, in addition to those discussed previously, to provide a bicycle carrier attachment further comprising:

a plurality of elongated slots.

It is therefore another aspect, advantage, objective and embodiment of the invention, in addition to those discussed previously, to provide a bicycle carrier attachment further comprising:

a beach chair holder comprising:

a vertical member having a mating tube projecting therefrom, the mating tube having a square-cross section dimensioned and configured to slide onto the first or second mating arm, whereby the beach chair holder may be attached to the central core support;

a horizontal member crossing a top end of the vertical member in a T-shape;

a plurality of semicircular brackets each having an upper opening, each attached to the horizontal member.

It is therefore another aspect, advantage, objective and embodiment of the invention, in addition to those discussed previously, to provide a bicycle carrier attachment system used for carrying sporting equipment, the bicycle carrier attachment for attachment to a bicycle seat post, the bicycle carrier attachment comprising:

a central core support;

a basket;

a snow board holder;

a surf board holder;

a beach chair holder;

the central core support comprising:

a tubular clamp having an aperture, the aperture having an inner diameter dimensioned and configured to encircle and attach to such bicycle seat post, the clamp having a slot dimensioned and configured to mechanically engage to part of such bicycle seat post;

a first angled central support section projecting at a first end from the tubular clamp at an angle to the tubular clamp;

a second central support section projecting from a second end of the first angled central support section;

first and second mating arms projecting from the second central support section, the first mating arm having a first arm bottom aperture and the second mating arm having a second arm bottom aperture, the first arm having a first arm step, the first arm step creating a first arm cross-section at a first arm end, the second arm having a second arm step, the second arm step creating a second arm cross-section at a second arm end;

the first angled central support section and the second central support section being constructed of a tubing having a square cross-section;

the first and second mating arms also being constructed of the tubing having a square cross-section;

a top support running along a top surface of the first angled central support section and the second central support section, the top support being flat, the top support further partially running along the first and second mating arms and forming the first and second arm steps;

first and second securing apertures passing vertically through the top support and the second central support section;

a third mating arm projecting from the second central support section, also being constructed of the tubing having a square cross-section, the top support running along the third mating arm to a third mating arm end, but the third mating arm having no step, whereby the combination of the top support and the square cross-section causes the third mating arm to have third mating arm cross-section which is different from the first and second mating arm cross-sections;

the basket comprising:

a basket bottom;

the basket bottom having first and second basket securing apertures dimensioned and configured to align with the first and second securing apertures of the top support and the second central support section;

an elongated planform such that the basket bottom is rectangular;

first and second tray walls extending upward from first and second opposite sides of the rectangular basket bottom;

first and second elongated apertures through the respective first and second tray walls;

third and fourth tray walls extending upward from third and fourth opposite sides of the rectangular basket bottom;

third and fourth apertures through the respective third and fourth tray walls; and an open top;

the snow board holder comprising:

a snow board holder having a snow board holder mating tube, the snow board holder mating tube having a snow board holder square-cross section dimensioned and configured to slide onto the first or second mating arm, whereby the snow board holder may be attached to the central core support;

the snow board holder having a snow board holder vertical member having upper and lower ends, the snow board holder mating tube projecting from the snow board holder vertical member;

snow board holder first and second upper arms projecting from the snow board holder vertical member upper end, the snow board holder first and second upper arms each having a snow board holder upper arm inner section and a snow board holder upper arm outer section;

the snow board holder upper arm inner sections having a snow board holder first curvature which transitions the snow board holder upper arm inner sections to the snow board holder vertical member;

snow board holder third and fourth lower arms projecting from the snow board holder vertical member lower end, the snow board holder third and fourth lower arms each having a snow board holder lower arm inner section and a snow board holder lower arm outer section;

the snow board holder lower arm inner sections having a snow board holder second curvature which transitions the snow board holder lower arm inner sections to the snow board holder vertical member;

a plurality of snow board holder elongated slots;

the snow board holder lower arm outer sections having an angle above the horizontal, such that the snow board holder second curvature of the snow board holder lower arm inner sections and the angle above the horizontal of the snow board holder lower arm outer sections cooperate to form a board edge valley;

the surf board holder comprising:

a surf board holder mating tube, the surf board holder mating tube having a surf board holder square-cross section dimensioned and configured to slide onto the first or second mating arm, whereby the surf board holder may be attached to the central core support;

the surf board holder having a surf board holder vertical member having surf board holder upper and lower ends, the surf board holder mating tube projecting from the surf board holder vertical member;

surf board holder first and second upper arms projecting from the surf board holder vertical member upper end, the surf board holder first and second upper arms each having a surf board holder upper arm inner section and a surf board holder upper arm outer section;

the surf board holder upper arm inner sections having a surf board holder first curvature which transitions the surf board holder upper arm inner sections to the surf board holder vertical member;

a surf board holder U-shaped lower support projecting from the lower end of the surf board holder vertical member, the surf board holder U-shaped lower support being horizontal;

a plurality of surf board holder elongated slots; and the beach chair holder comprising:

a beach chair holder vertical member having a beach chair holder mating tube projecting therefrom, the beach chair holder mating tube having a beach chair holder square-cross section dimensioned and configured to slide onto the first or second mating arm, whereby the beach chair holder may be attached to the central core support;

a beach chair holder horizontal member crossing a top end of the beach chair holder vertical member in a T-shape;

a plurality of beach chair holder semicircular brackets each having a beach chair holder upper opening, each attached to the beach chair holder horizontal member.

INDEX TO REFERENCE NUMERALS

Figure 1:
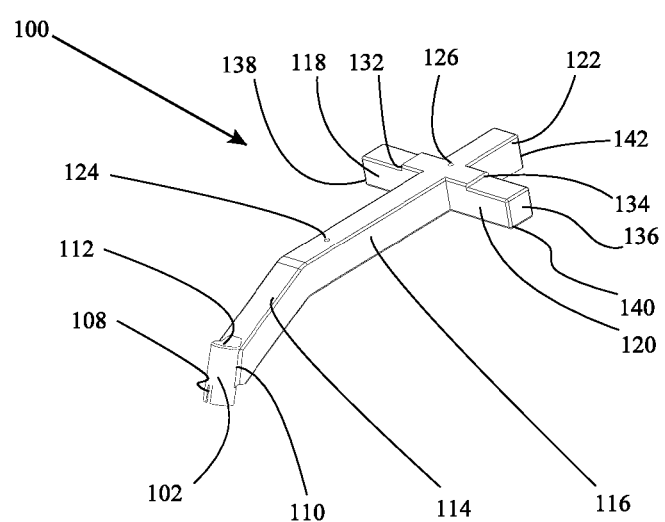
FIG. 1 is an orthogonal three-quarter view of a first embodiment of the invention, a core support for attachment to a bicycle seat post, having three arms for additional accessories specialized to carry particular equipment.

FIGS. 1-6:
Core support 100
Clamp 102
Top support 104
Clamp slot 108
Fillet 110
Clamp aperture 112
First angled central support section 114
Second central support section 116
First mating arm 118
Second mating arm 120
Third (different cross-section) mating arm 122
First securing aperture 124
Second securing aperture 126
First arm bottom aperture 128
Second arm bottom aperture 130
First arm step 132
Second arm step 134
Second arm cross-section 136
First arm end 138
Second arm end 140
Third mating arm end 142
FIGS. 7-10:
Snow board holder 200
First and second upper arms 202
Upper arm inner section 204
Upper arm outer section 206
Upper arm inner section curvature 208
Third and fourth lower arms 210
Lower arm inner section 212
Lower arm outer section 214
Lower arm inner section curvature 216
Vertical member 218
Board edge valley 220
Strap slots 222, 224, 226, 228
Mating tube 230
Mating tube first section 232
Mating tube second section 234
Mating tube angle 236
Mating tube interior cross-section 238
Upper end 240
Lower end 242
FIGS. 11-14:
Surf board holder 300
First and second upper arms 302
Upper arm inner section 304
Upper arm outer section 306
Upper arm inner section curvature 308
Lower U-shape support 310
Vertical member 312
Strap slots 314, 316, 318, 320

Mating tube 322
Mating tube first section 324
Mating tube second section 326
Mating tube angle 328
Mating tube interior cross-section 330
FIGS. 15-18:
Beach chair holder 400
First, second, third, and fourth acruate arms 402
Vertical support 404
Horizontal member 406
Simplified mating tube 408
Mating tube cross-section 410
FIGS. 19-21:
Basket accessory 500
First and second securing apertures 502, 504
First and second tray & elongated aperture side walls 506, 508
First and second tray & short aperture end walls 510, 512
Bottom 514
Open top 516
FIGS. 22-27:
Core support 600
Clamp 602
Top support 604
Clamp slot 608
Fillet 610
Clamp aperture 612
First angled central support section 614
Second central support section 616
First mating arm 618
Second mating arm 620
Third (different cross-section) mating arm 622
First securing aperture 624
Second securing aperture 626
First arm bottom aperture 628'
Second arm bottom aperture 630'
First arm step 632
Second arm step 634
Second arm cross-section 636
First arm end 638
Second arm end 640
Third mating arm end 642
FIGS. 33-36:
Surf board holder 800
First and second upper arms 802
Upper arm inner section 804
Upper arm outer section 806
Upper arm inner section curvature 808
Lower U-shape support 810
Vertical member 812
Strap slots 814, 816, 818, 820
Mating tube 822
Mating tube interior cross-section 830
FIGS. 37-39:
Beach chair holder 900
First, second, third, and fourth angular arms 902
Vertical support 904
Horizontal member 906
Simplified mating tube 908
Mating tube cross-section 910
FIGS. 40-43:
Basket accessory 1000
First, second, and third ends 1018, 1020, 1022
Open end 1024
FIGS. 44-47:
Ski holder 1100
Identical arm 1102
Arm inner section 1104
Arm outer section 1106
Vertical member 1112
Strap slot 1114
Mating tube 1122

DETAILED DESCRIPTION

Glossary

As used herein the term "cross-section" refers to both dimensions and configuration (size and shape) of the end of a structural member. A square beam member such as an arm will have an end having a square cross-section, while a rectangular member end would have a rectangular cross-section, a circular member end would have a circular cross-section and so forth. This cross-section may also be an interior cross-section for tubes, and when external and internal cross-sections are the same, the tubular member may slide over the beam member, securing itself thereto by mechanical engagement.

The term seat post as used herein may refer to either the seat post projecting from the bottom of a bicycle seat, or may refer to the seat tube (a member of the bicycle frame) into which the seat post projects. Both are intended by the term seat post.

End Glossary

Figure 2:
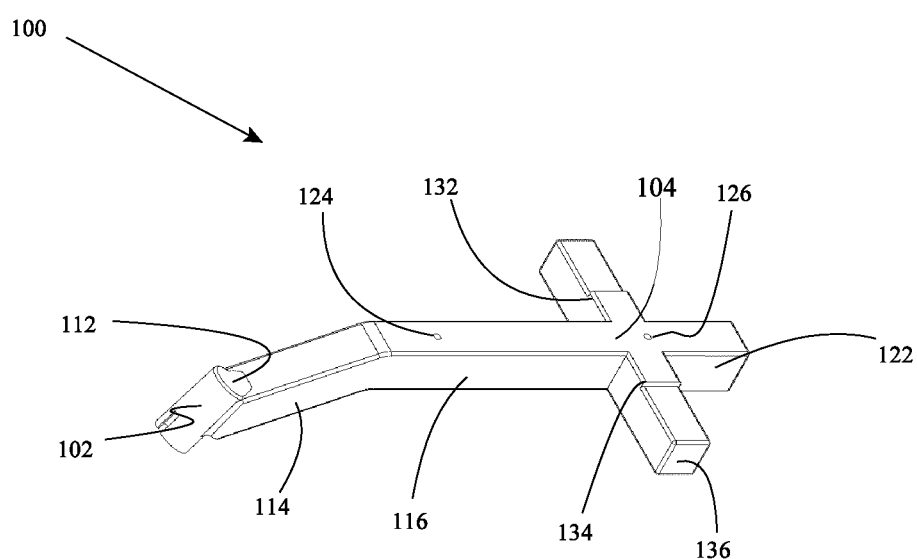
FIG. 2 is an oblique elevational side view of the first embodiment of the invention, showing further details of the structure of the core support.

FIG. 1 is an orthogonal three-quarter view of a first embodiment of the invention, a core support 100 for attachment to a bicycle seat post, having three arms 118, 120, 122 for additional accessories specialized to carry particular equipment. FIG. 2 is an oblique elevational side view of the first embodiment of the invention, showing further details of the structure of the core support 100.

Core support 100 will fit onto a bicycle seat post or seat tube (a part of the frame) and be secured thereto, projecting upward and backward over the rear wheel of the bicycle. The core support 100 may or may not be configured to actually carry any sporting equipment itself, but it is configured to serve as an attachment point for numerous other types of specialized racks. These racks will attach to the arms of the core support 100, and will themselves have arms, hooks, baskets, projections, and so forth which are dimensioned and configured to in turn support various items of sporting equipment such as beach chairs, surf boards, snow boards, skis, and so forth.

Core support 100 is secured to a seat tube or seat post by a clamp 102, which is itself a generally tubular (circular cross-section) body having a clamp aperture 112 passing through. The clamp 102, clamp aperture 112 and the clamp slot 108 are dimensioned and configured to pass around the seat post/seat tube and also to mechanically engage to it, so that the core support 100 is held rigid in position in place by the single attachment to the bicycle.

Fillet 110 may be present to strengthen the connection of the clamp 102 to the first angled central support section 114, which is angled upward in order to reach a more convenient height over the rear wheel and the ground.

Second central support section 116 may then be either flat or angled, and is attached to the first angled central support section 114, projecting even further backward over the wheel.

First mating arm 118, second mating arm 120 and third (different cross-section) mating arm 122 project from the second central support section 116. In this embodiment the invention has a cruciform planform but that is merely the result of early testing showing that this is a useful shape. Other configurations include only two arms, or five arms (two on each side for additional support, especially in torque), arms at angles other than 90 degrees, arms which are not strictly horizontal but project upward at any angle, and so forth.

First securing aperture 124 and second securing aperture 126 allow the attachment of additional types of specialized racks which would not conveniently fit onto the mating arms 118, 120 and 122. For example, the fifth embodiment of the invention may be a basket which sits atop the core support 100 and is secured thereto by fasteners (bolts, elastic, screws, etc) which pass through both the specialized rack and the securing apertures 124 and/or 126.

Top support 104 adds additional strength to the core support 100 by increasing the thickness in the dimension which may experience the most load, the vertical. In this embodiment, the top support 104 extends only partially or not at all out the first and second mating arms 118 and 120, but extends fully out the third mating arm 122.

This means that there are first arm step 132 and second arm step 134, which narrow the cross-sections of these two arms (see for example second arm cross-section 136) to the desired dimension and configuration (in this case, a square cross-section). However, the optional third mating arm 122 may simply be used for additional support of items such as a basket, or for other mechanical purposes, or 122 may in optional embodiments be intended to hold a different type of specialized rack having a different cross-section of mating tube thereon.

First arm end 138, and second arm end 140 as well as third mating arm end 142 may be seen in this view, however, only the second arm end cross-section 136 may actually be observed in this view: a square shape. (In the presently preferred embodiments and best modes presently contemplated, this square shape may have a width and depth of between one and two inches (approx 25 to 50 mm), however, it may be smaller or larger without departing the scope of the claimed invention.

Figure 3:
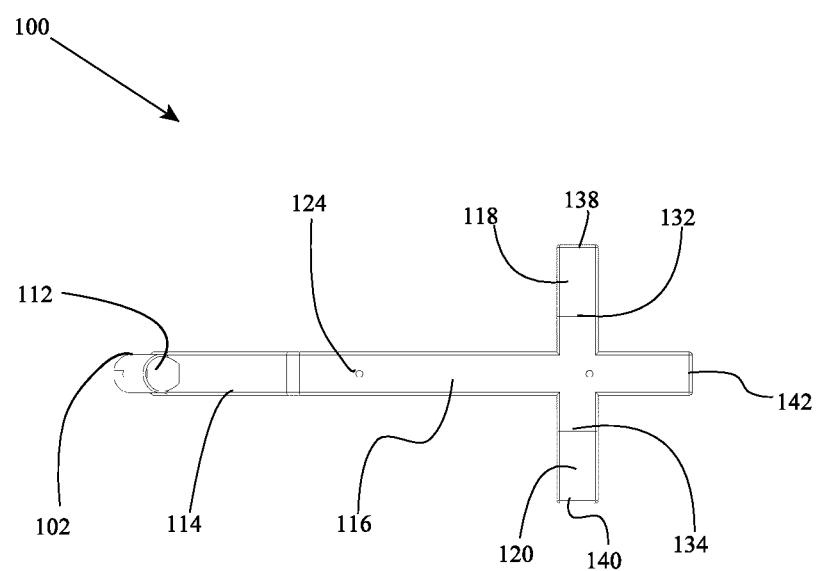
FIG. 3 is a top planform view of the first embodiment of the invention, the core support.

FIG. 3 is a top planform view of the first embodiment of the invention, the core support. In particular, aperture 112 of clamp 102 is more easily seen from the top view than otherwise. The third arm end 142 is also more clearly visible, though the cross-section of that arm is not in view.

Figure 4:
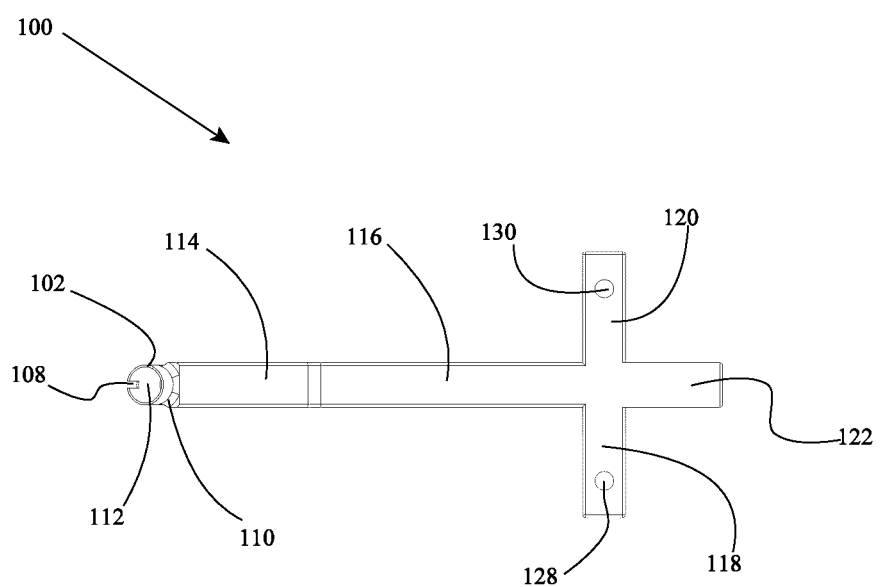
FIG. 4 is a bottom view of the first, core support, embodiment of the invention, showing the underside.

FIG. 4 is a bottom view of the first, core support, embodiment of the invention, showing the underside of the core support 100.

Since this is an underside view, the position of the first and second arms 118 and 120 is reversed (relative to the viewer). First arm bottom aperture 128 may be seen on first arm 118, and second arm bottom aperture 130 may be seen on the bottom of the second arm 120.

Aperture 112 of clamp 102, and slot 108 in the clamp 102 are also more easily seen from this bottom view.

Figure 5:
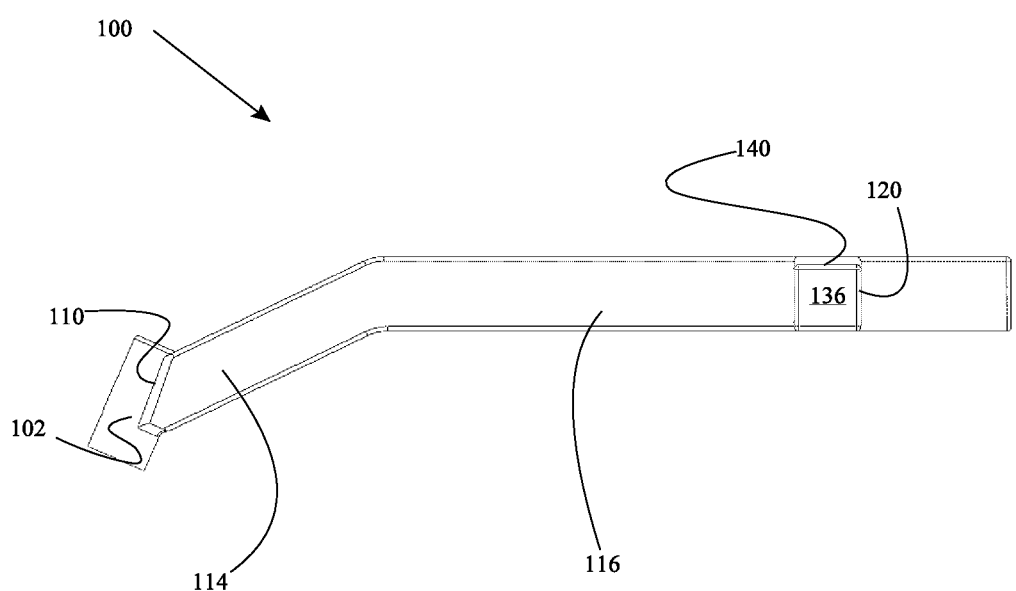
FIG. 5 is a side view of the core support/first embodiment of the invention, showing the fillet between the clamp portion and the first angled central support section.

FIG. 5 is a side view of the core support/first embodiment of the invention, showing the fillet 110 between the clamp portion 102 and the first angled central support section 114.

Also, in this view the cross-section 136 of second arm 120 is seen straight on and the fact that the cross-section 136 is a square may be plainly seen. Obviously as mentioned previously the cross-section 136 of a circular arm 120 would be circular (for example if the arm 120 were made of circular tubing). Also obviously, step 134 makes the arm 120 and the cross-section 136 thereof into squares, however, the arm 122 (which in this view is the terminus of the support section 116) has a rectangular cross section which need not even be used as an arm at all.

Figure 6:
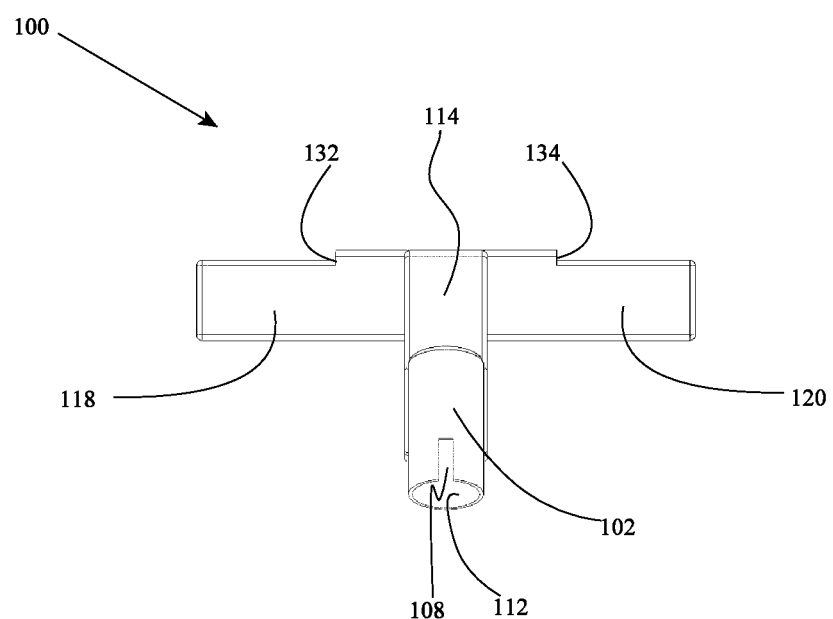
FIG. 6 is a front view of the first embodiment of the invention, showing the clamp and clamp slot in greater detail.

FIG. 6 is a front view of the first embodiment of the invention, showing the clamp 102 and clamp slot 108 in greater detail.

This end view of the invention more clearly shows how top support 104 ends, creating steps 132 and 134. The use of the top support 104 and steps 132 and 134 is optional and need not be present in all embodiments of the invention.

Figure 7:
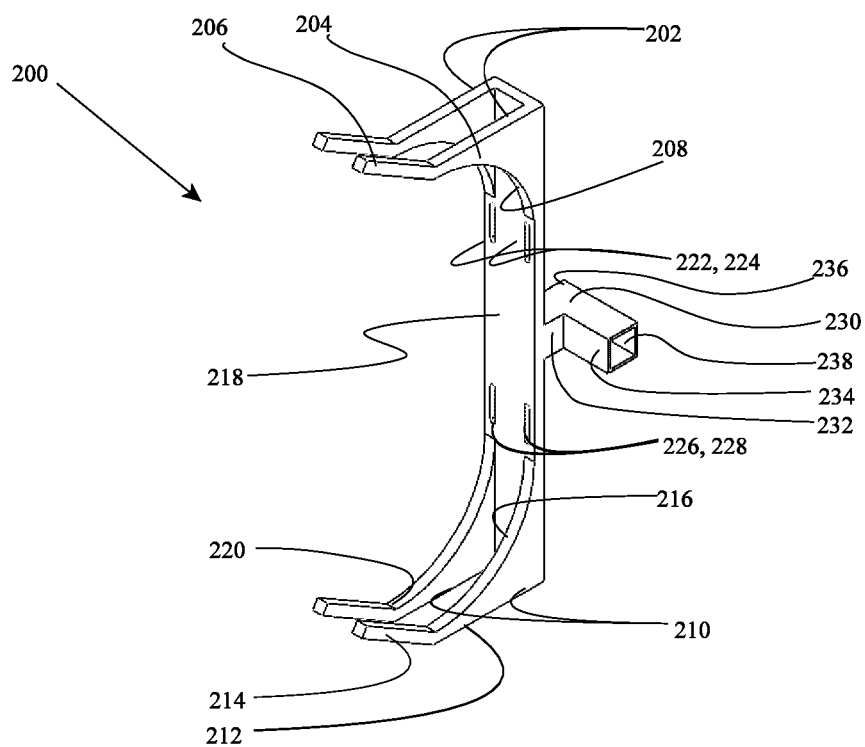
FIG. 7 is an oblique elevational side view of a second embodiment of the invention, a snowboard holder having upper and lower arms dimensioned and configured to engage a snowboard, strap slots, and a mating tube to attach to an arm of the core support.
Figure 8:
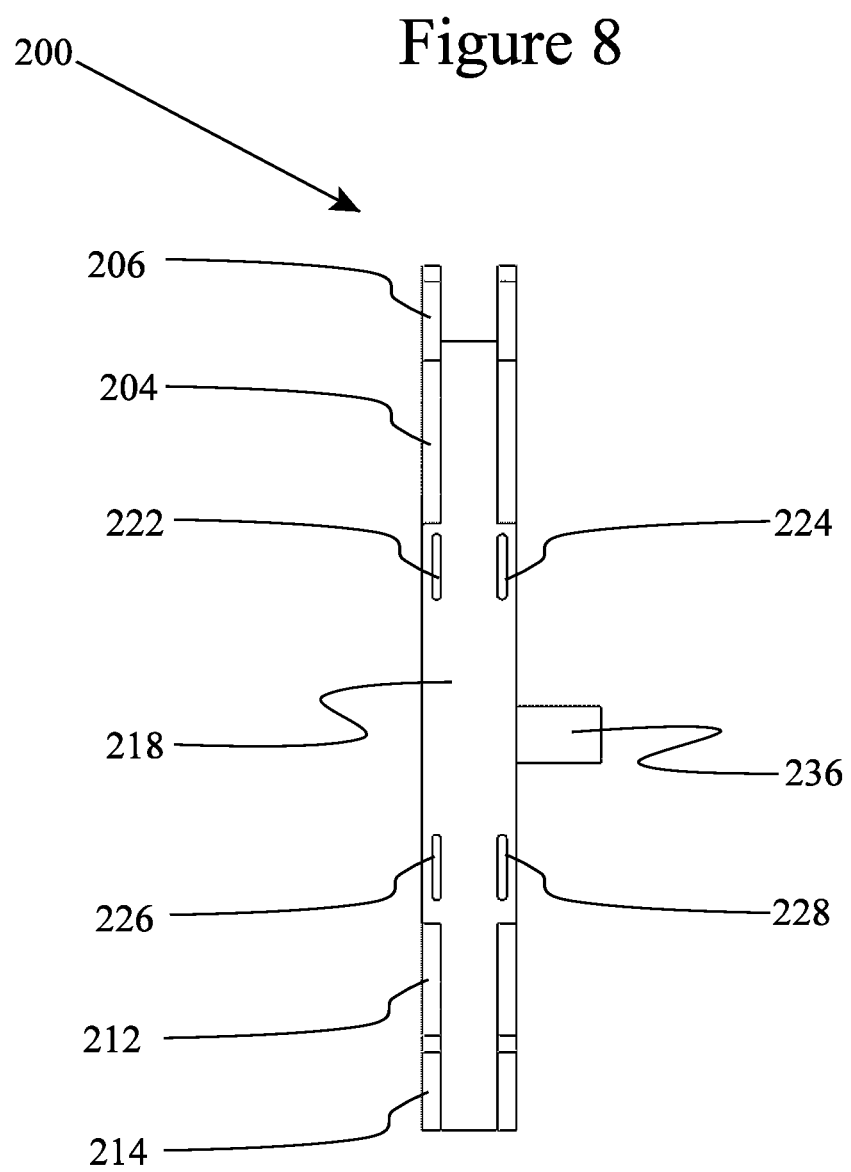
FIG. 8 is a side view of the second embodiment of the invention, the snow board holder, showing further details of the upper and lower arms inner and outer sections and the strap slots.
Figure 9:
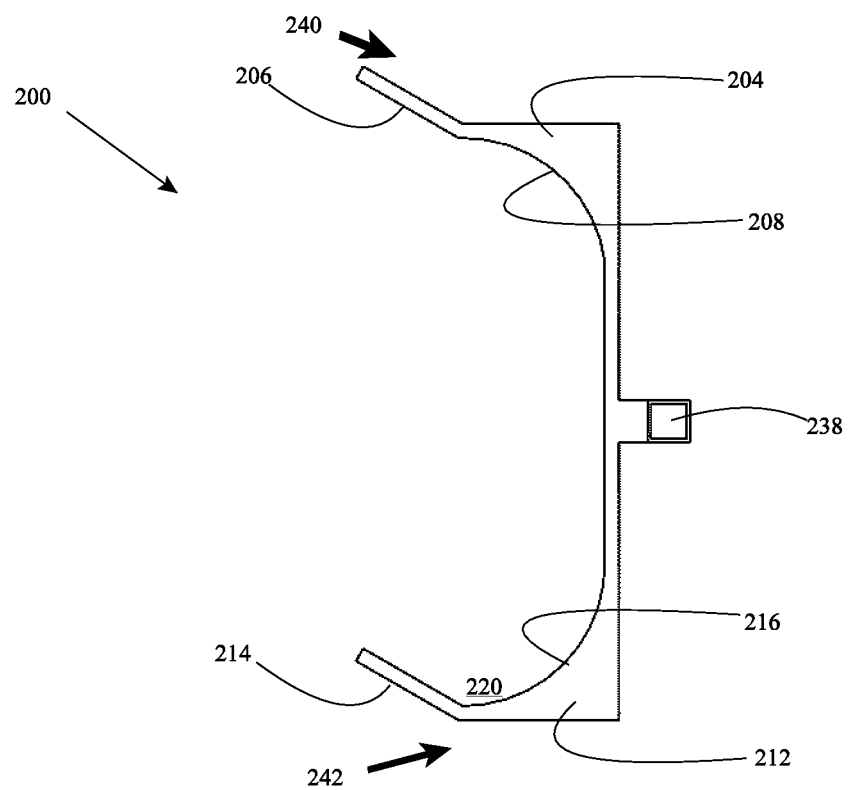
FIG. 9 is a front view of the second embodiment of the invention, the snow board holder, showing the cross-section of the mating tube dimensioned and configured to mate to an arm of the core support.
Figure 10:
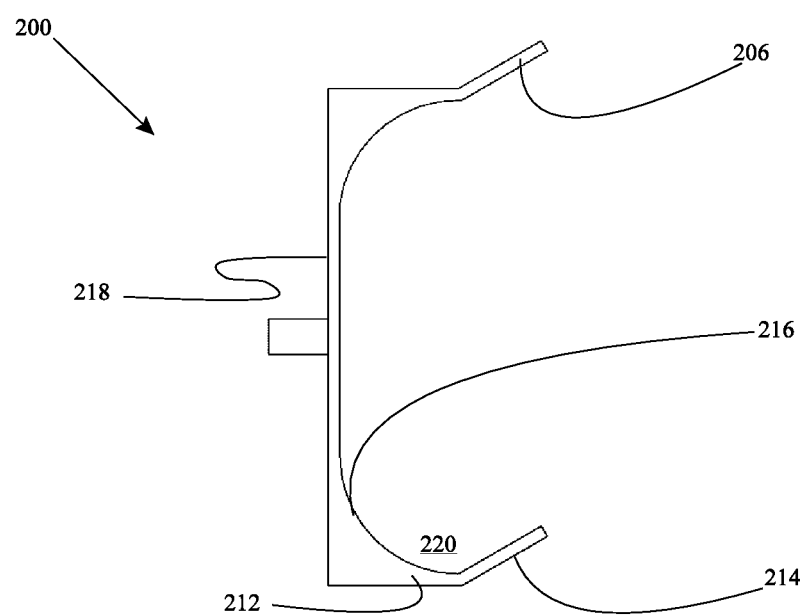
FIG. 10 is a rear view of the second embodiment of the invention, the snow board holder.

FIG. 7 is an oblique elevational side view of a second embodiment of the invention, a snowboard holder 200 having upper and lower arms 202, 210 dimensioned and configured to engage a snowboard, and also strap slots, and a mating tube 230 to attach to an arm of the core support. FIG. is a side view of the second embodiment of the invention, the snow board holder 200, showing further details of the upper and lower arms 202, 210 inner 204, 212 and outer 206, 214 sections and the strap slots (222, 224, 226, 228), and FIG. 9 is a front view of the second embodiment of the invention, the snow board holder, showing the cross-section of the mating tube 232 dimensioned and configured to mate to an arm (118, 120) of the core support 100. Finally FIG. 10 is a rear view of the second embodiment of the invention, the snow board holder 200.

The spine of the snow board holder 200 is the vertical member 218, having upper end 240 and lower end 242. The length of 218 will be proportionate to the sporting equipment carried.

Snow board holder 200 is used in conjunction with the core support 100 described in the paragraphs immediately preceding this. The snow board holder 200 has a mating tube 230 which physically engages to one of the support arms 118 or 120 (but in this version/embodiment is NOT dimensioned and configured to engage to the third mating arm 122, though in other alternatives it may be). When mating tube 230 slides over a support arm (for example 120), it allows the support arm 120 to hold up the snow board holder 200. The mechanical engagement (square tube into square socket) may be enhanced with snap fits, spring loaded detents, fasteners (as defined previously bolts, etc) if the arm and tube have apertures provided in alternative embodiments, and other structures.

The snow board holder 200 then holds a snow board securely in place, aided in embodiments having multiple supports on the same side of the core support 100 and thus having multiple snow board holders on a single snow board, or by the use of straps (for which strap slots are provided in the support 200).

The shape of the arms of the snow board support 200 is carefully designed, being dimensioned and configured to accept a snow board running sideways between the arms, and with the arms having slightly differing shapes to hold the snow board mechanically. In particular, first and second upper arms 202 have upper arm inner sections 204 and upper arm outer sections 206 which slope upward away from the vertical member 218, which serves as a spine of the device. Upper arm inner section curvature 208 will tend to allow a snow board to rest at whatever point is natural for that particular width of board (snow boards vary slightly in width). However, third and fourth lower arms 210 have a different shape. The lower arm inner sections 212 may mirror the upper arms inner sections 204 in having a lower arm inner section curvature 214 similar or in some embodiments identical to the upper arm inner section 204 (sloping downward away from the vertical member 218), and thus providing a smooth curvature 216 allowing the board edge to find a natural resting point. In contrast, the lower arm outer section 214 is not a mirror of 206, the upper arm outer section, instead it also rises as it moves away from the vertical member 218, forming a noticeable board edge valley 220.

Obviously, the edge of the snow board will automatically slide into this valley 220 when the board is placed sideways into the holder. The lower arm outer sections 214 sloping upward will then tend to hold it in place.

Since bicycle riding involves bumps and jolts, strap slots 222, 224, 226, 228 may be provided to better secure the board using straps which pass through the vertical member 218 and then around the board. These straps may have buckles, snaps, buttons, zips, hook-and-loop fabric (ie Velcro® or the like), and so forth, which allows the straps to adjust to the size of the board.

Note that the length of the vertical member 218 is important, as it must be roughly proportional to the width of a snow board. This width is very different from the width (and for that matter shape) of a surf board, a skate board, a penny board, a pair of skis and so on.

In alternative embodiments, this width may be accounted for by allowing structure for the adjustment of the length of the vertical member 218.

Mating tube 230 is slightly complex in this embodiment, as two arms 118, 120 on opposite sides of the core support 100, are used to hold two snow board supports 200, each a small distance apart. The snow board then is held on two supports 200, cross-wise over/behind the rear wheel of the bicycle. Note that the two snow board supports 200 will make a set in which they are almost identical, but have mirror image mating tube angles 236, one right-handed and one left-handed so as to allow one to sit on one arm (118) and the other on the other arm (120), and both project backward behind the core support 100.

In other embodiments, there may be two arms on the same side of the core support 100, and the mating tube 230 may be straight, allowing the board to be held parallel to the bike rather than cross-wise, however, this embodiment as depicted holds the board cross-wise, perpendicular, to the bicycle rear wheel.

Mating tube first section 232 may be long enough to hold within it a sufficient length of the support arm (118, 120) to allow a firm mechanical engagement. Mating tube second section 234 on the other hand, is perpendicular to the first section 232, at mating tube angle 236. The second section 234 may be proportionate in length to the third arm 122 of the core support 120, so that the snow board support 200 extends backward beyond the third arm 122. (Note that the third arm 122 is NOT used in this embodiment.)

Finally, the mating tube interior cross-section 238, as noted previously, is dimensioned and configured to mechanically engage to the support arms 118 and 120 by slipping over them.

Figure 11:
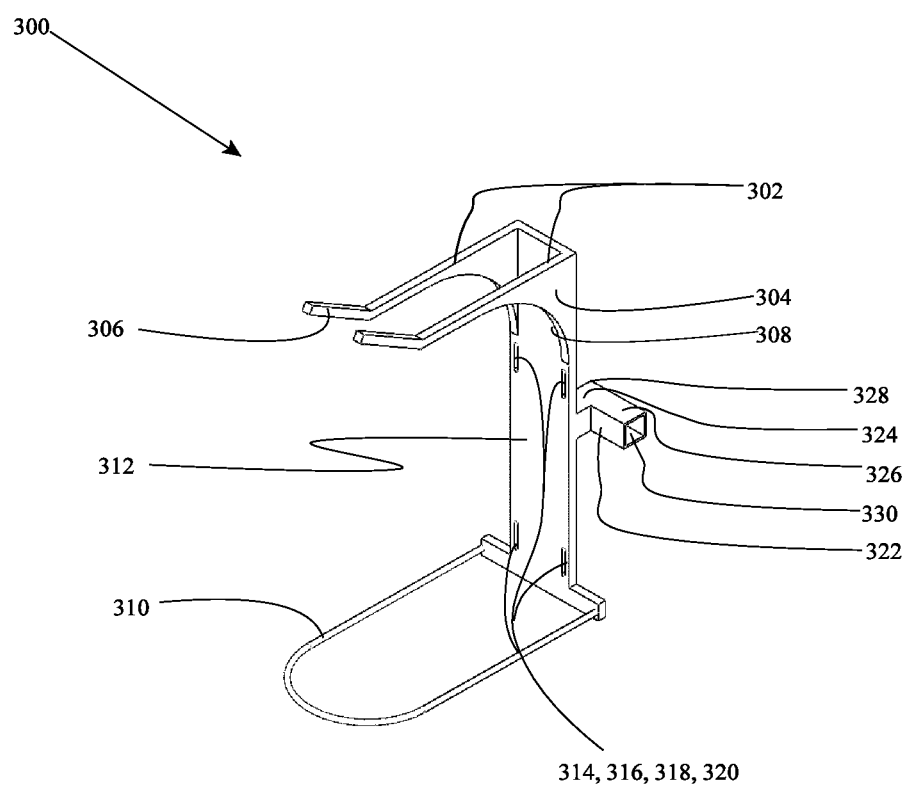
FIG. 11 is an elevational oblique view of the third embodiment of the invention, a surfboard holder accessory designed to hold a surfboard.
Figure 12:
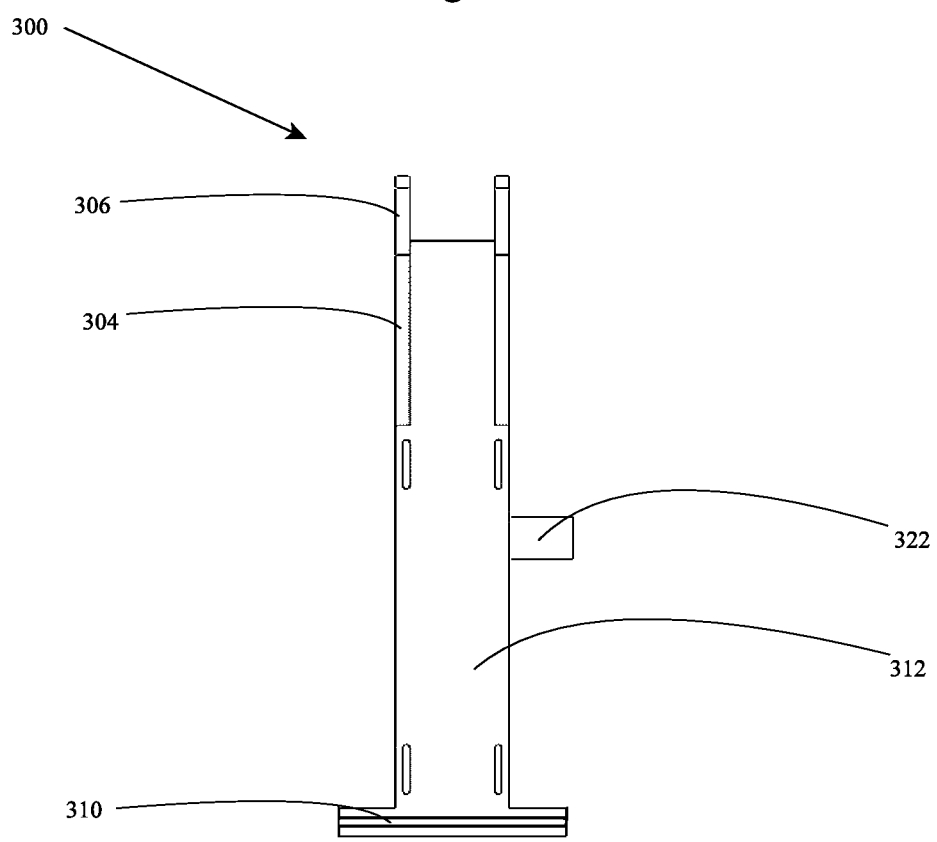
FIG. 12 is a side view of the third embodiment of the invention, the surf board holder, showing further details of the board support, the upper arms, the strap slots, etc.
Figure 13:
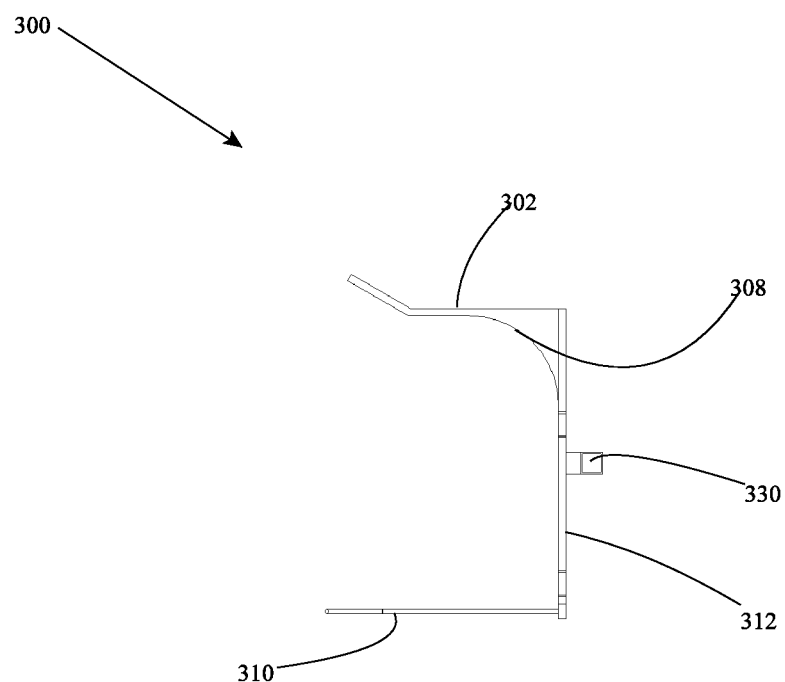
FIG. 13 is a front view of the third embodiment of the invention, the surf board holder, showing the cross-section of the mating tube.
Figure 14:
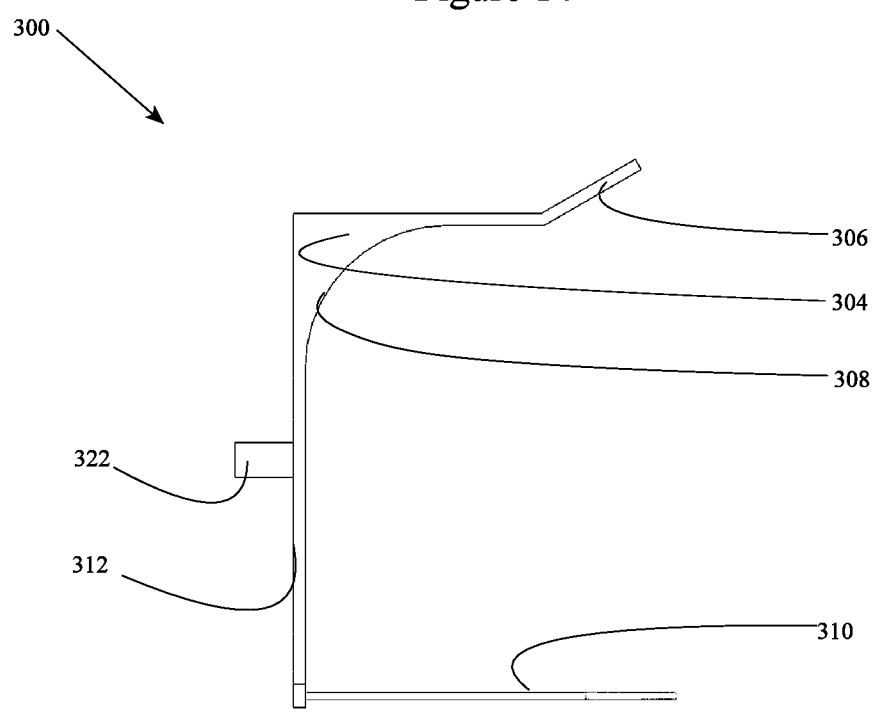
FIG. 14 is a rear view of the third embodiment (surf board holder) of the invention.

FIG. 11 is an elevational oblique view of the third embodiment of the invention, a surfboard holder accessory 300 designed to hold a surfboard. FIG. 12 is a side view of the third embodiment of the invention, the surf board holder 300, showing further details of the board support 310, the upper arms 304, the strap slots (314, 316, 318, 320), etc, and FIG. 13 is a front view of the third embodiment of the invention, the surf board holder 300, showing the cross-section of the mating tube 322, while FIG. 14 is a rear view of the surf board holder 300 of the invention.

The spine of the surf board holder 300 is the vertical member 312, having a length proportionate to the sporting equipment carried: a surf board. Note that a surf board is considerably wider and thicker than a snow board: a snow board is under one inch thick, but a surf board is several inches thick, and the edge is NOT sharp, unlike a snow board it is quite rounded.

Surf board holder 300 has first and second upper arms 302, having upper arm inner section and upper arm outer section 306. These are much like the upper arms 202 of the snow board holder 200, for example, having upper arm inner section curvature 308 to allow the top edge of the surf board to lay against the vertical member 312 at an appropriate spot.

However, there are no lower arms. Due to the differences between snow and surf boards, this device 300 has a different shape. Instead of two lower arms there is a single lower U-shape support 310, much like a bail or a U-bolt, at the lower end of the vertical member 312. This provides a broader support, losing the valley but allowing a much greater width of boards to be used.

Strap slots 314, 316, 318, 320 will once again host straps (not shown) which may be put about the sporting equipment to hold it on.

Mating tube 322 however is much like mating tube 232. Two arms 118, 120 on opposite sides of the core support 100, are used to hold two mirror-image surf board supports 300, a set. The surf board then is held on two supports 300, cross-wise over/behind the rear wheel of the bicycle.

In other embodiments, there may be two arms on the same side of the core support 100, and the mating tube 322 may be straight, allowing the board to be held parallel to the bike rather than cross-wise, however, this embodiment as depicted holds the board cross-wise, perpendicular, to the bicycle rear wheel.

Mating tube first section 324 may be long enough to hold within it a sufficient length of the support arm (118, 120) to allow a firm mechanical engagement while mating tube second section 326 is perpendicular to the first section 324, at mating tube angle 328, all still as previously described for the previous embodiment two. Again, the third arm 122 of the core support 100 is not actually used an arm in this embodiment.

Finally, the mating tube interior cross-section 330, as noted previously several times, is dimensioned and configured to mechanically engage to the support arms 118 and 120 by slipping over them.

Figure 15:
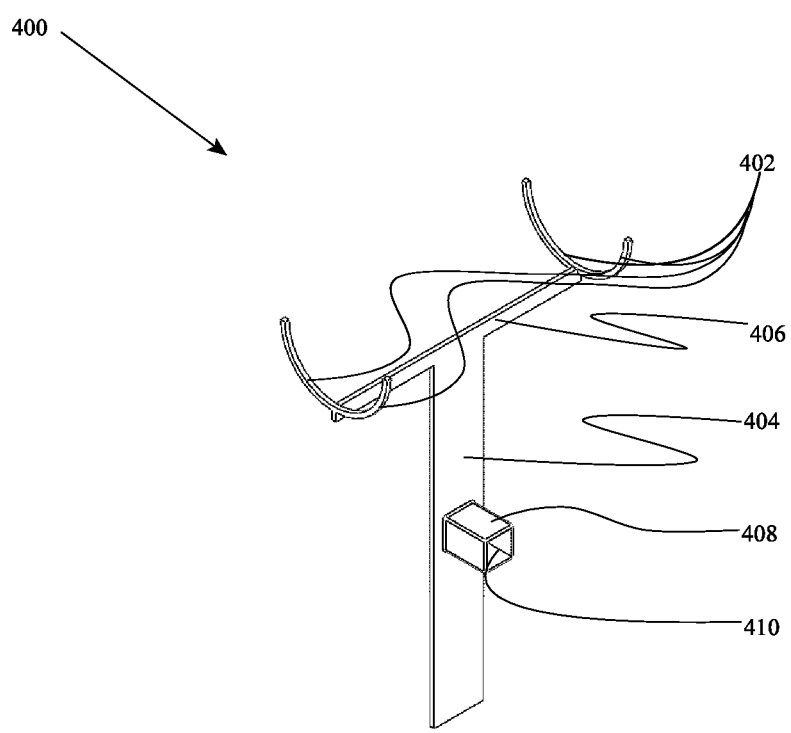
FIG. 15 is an elevational oblique front view of the fourth embodiment of the invention, a beach chair holder designed to support a folded beach chair, showing a simple mating tube arrangement.
Figure 16:
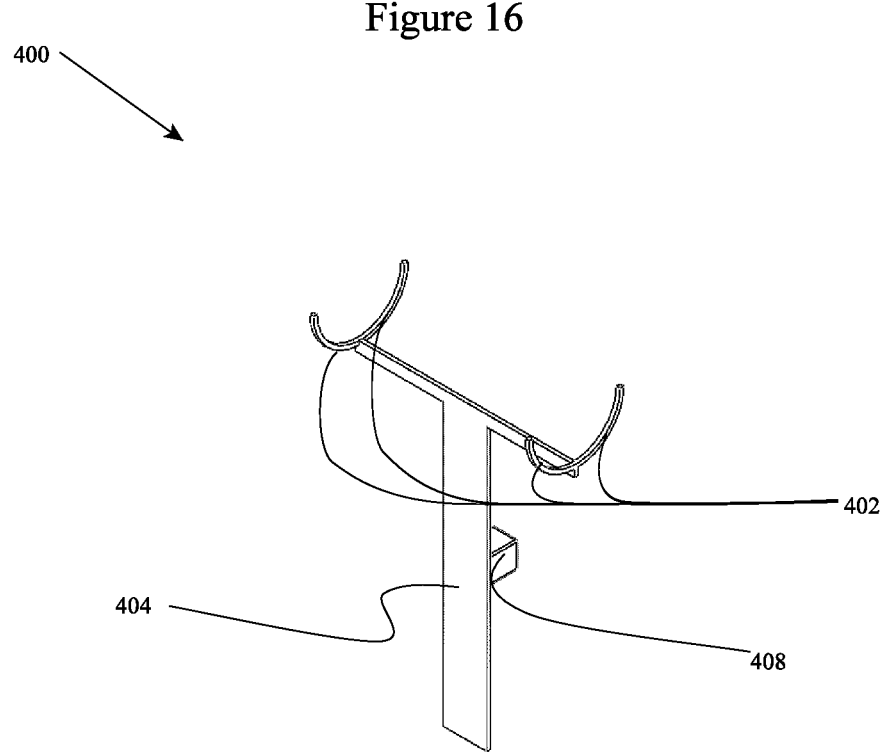
FIG. 16 is an oblique elevational rear view of the fourth embodiment of the invention showing the back side.

FIG. 15 is an elevational oblique front view of the fourth embodiment of the invention, a beach chair holder 400 designed to support a folded beach chair, showing a simple mating tube arrangement 408. FIG. 16 is an oblique elevational rear view of the fourth embodiment of the invention showing the back side.

Beach chair holder 400 has at the top first, second, third, and fourth acruate arms 402, which depend from a horizontal member 406. Note that the four arcuate arms 402 may be considered to be two semi-circular arms instead, but for this discussion are referred to as four arms.

Vertical support 404 has at its top end the horizontal member 406 and has on side and projecting therefrom the simplified mating tube 408, which simply sticks out straight without an angle. Mating tube cross-section 410 may be seen to be square in this embodiment, though it could be rectangular, circular and so forth.

Figure 17:
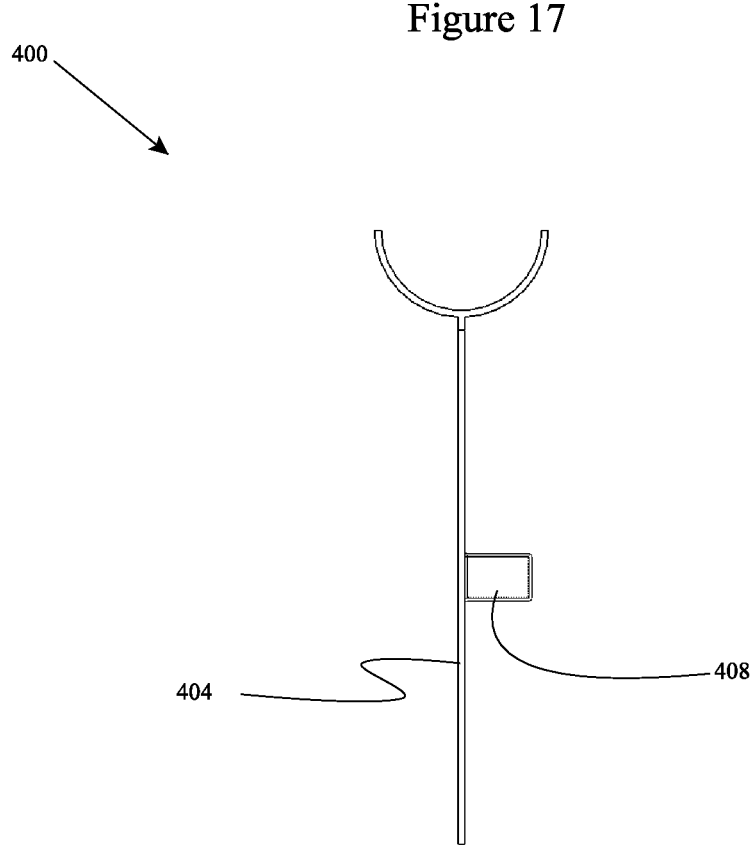
FIG. 17 is a side view of the beach chair holder—fourth embodiment of the invention—showing the projection of the mating tube.

FIG. 17 is a side view of the beach chair holder—this fourth embodiment of the invention—showing the projection of the mating tube 408. Note that this is a SIDE view of the mating tube, not showing the cross-section: this mating tube 408 projects straight from the vertical support 404, so FIG. 17 is strictly a side view of the mating tube 408 and this figure does not show the cross-section 410. It may be seen that this mating tube 408 lacks an angle and thus differs from the mating tubes 232 and 322.

In use, one beach chair holder 400 is attached to one support arm (118 or 120), unlike the board holders previously shown which required two holders (either 200 or 300) in tandem. A beach chair is then folded and hung from the pair of troughs formed by the four arcuate arms, hanging down parallel to the rear wheel rather than perpendicular, as the boards would from pairs of holders 200 or 300.

Figure 18:
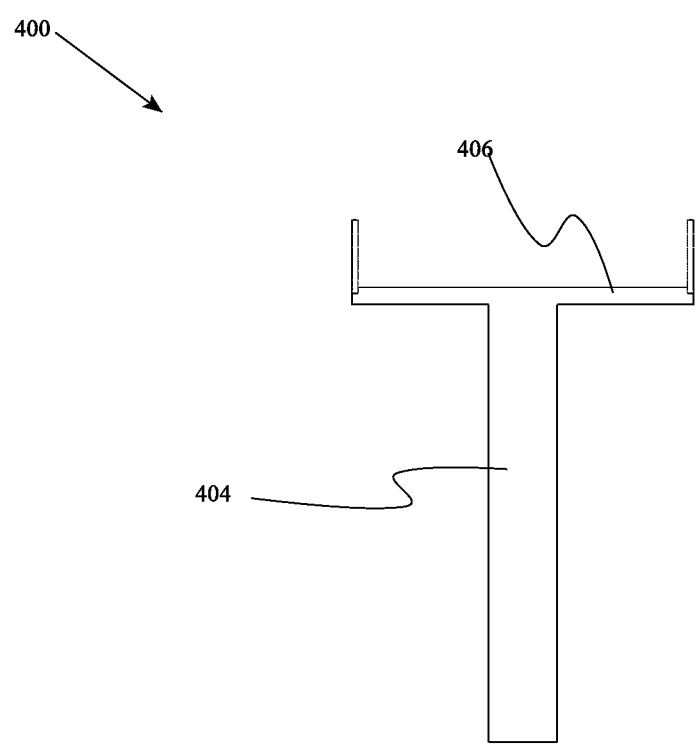
FIG. 18 is a simple rear view of the beach chair holder fourth embodiment of the invention.

FIG. 18 is a simple rear view of the beach chair holder fourth embodiment of the invention, showing the vertical support 404, horizontal member 406 and two of the four arcuate arms 402.

Figure 19:
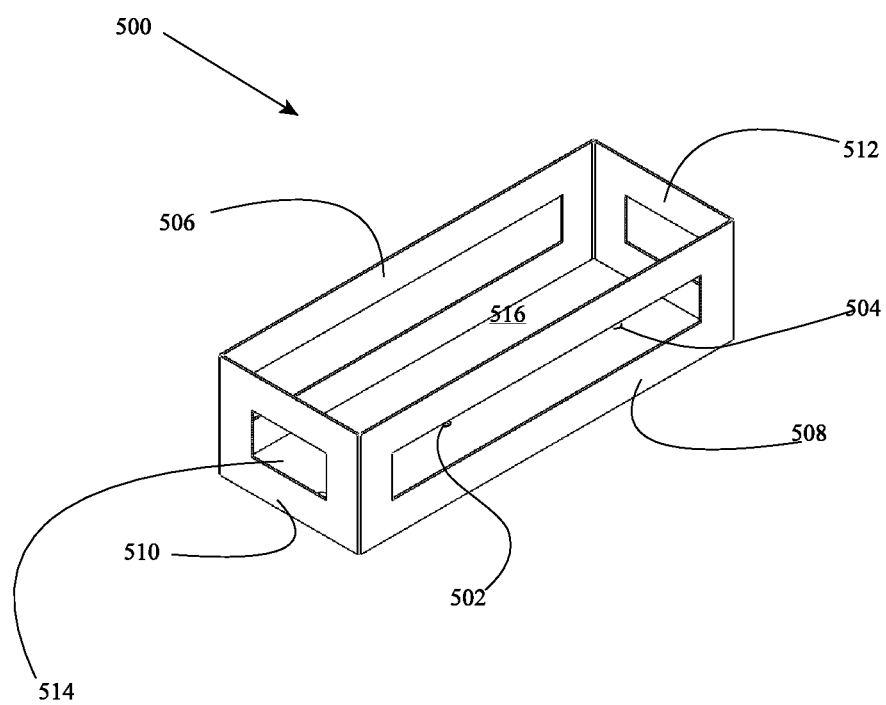
FIG. 19 is a three-quarter elevational view of the basket embodiment of the invention—this fifth embodiment having an entirely different fastening system from the previous accessories depicted.

FIG. 19 is a three-quarter elevational view of the basket embodiment 500 of the invention. This embodiment has an entirely different fastening system from the previous accessories depicted.

Basket accessory 500 does not use the support arms 118 and 120 for attachment, resting on top of the central core 100 instead of being attached to one side. First and second securing apertures 502, 504 match to first and second securing apertures 124 and 126, with fasteners through both sets. First and second tray & side walls 506, 508 feature elongated apertures therethrough, while the first and second tray & end walls 510, 512 have shorter apertures through them. Bottom 514 may be solid (except for the securing apertures 502 & 504) or it may be mesh, wire, etc. Finally the open top 516 allows objects to be freely placed within the basket.

Figure 20:
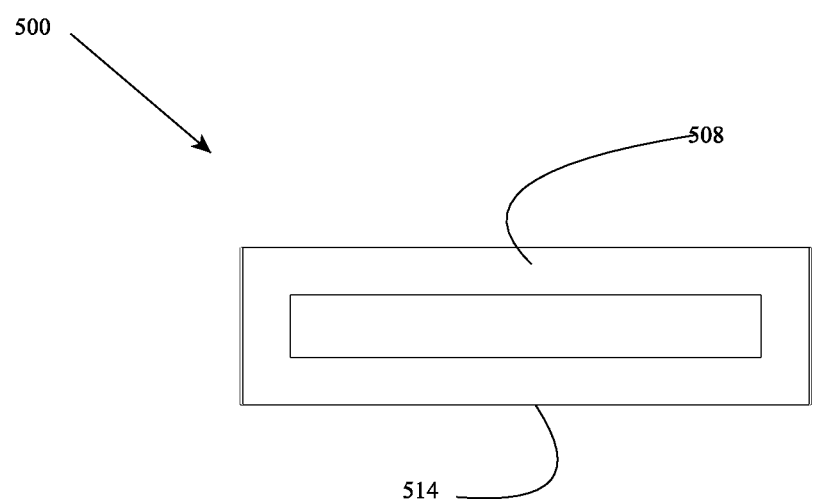
FIG. 20 is a side view of the basket (fifth) embodiment of the invention, used for carrying general and miscellaneous articles.
Figure 21:
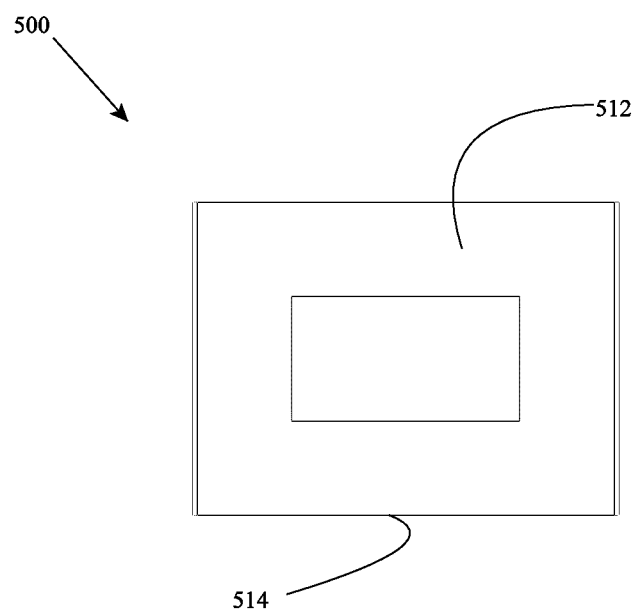
FIG. 21 is an end view of the fifth (basket) embodiment of the invention, emphasizing the high walls of the basket for retaining a wide variety of objects therein.

FIG. 20 is a side view of the basket 500 (fifth) embodiment of the invention, used for carrying general and miscellaneous articles. In this view it is very obvious that the side walls (508 visible and 506 not visible) have long apertures, and referring to FIG. 21, which is an end view of the fifth (basket 500) embodiment of the invention, short apertures are seen.

The drawings emphasize the high walls (506, 508, 510, 512) of the basket 500 for retaining a wide variety of objects therein. In particular, the basket 500 may form a solid tray up to the level of the side wall apertures, so even small objects may be placed therein securely. Larger objects placed in the basket are less likely to be able to fall through the apertured walls, and even larger objects may project from the open top 516.

However, the apertured walls have another function provided by their structure. In general, various types of sporting equipment are long and flat or long and narrow: hockey sticks, tennis rackets, paddles, fishing poles, nets, stands, poles and so forth. By passing such equipment through the apertured walls (506, 508, 510, 512), the equipment is supported and may be secured with elastic cables, tie-downs, string and so forth. Equipment may be passed through the elongated apertures or the shorter apertures, whichever is more convenient for the shape of the equipment.

Figure 22:
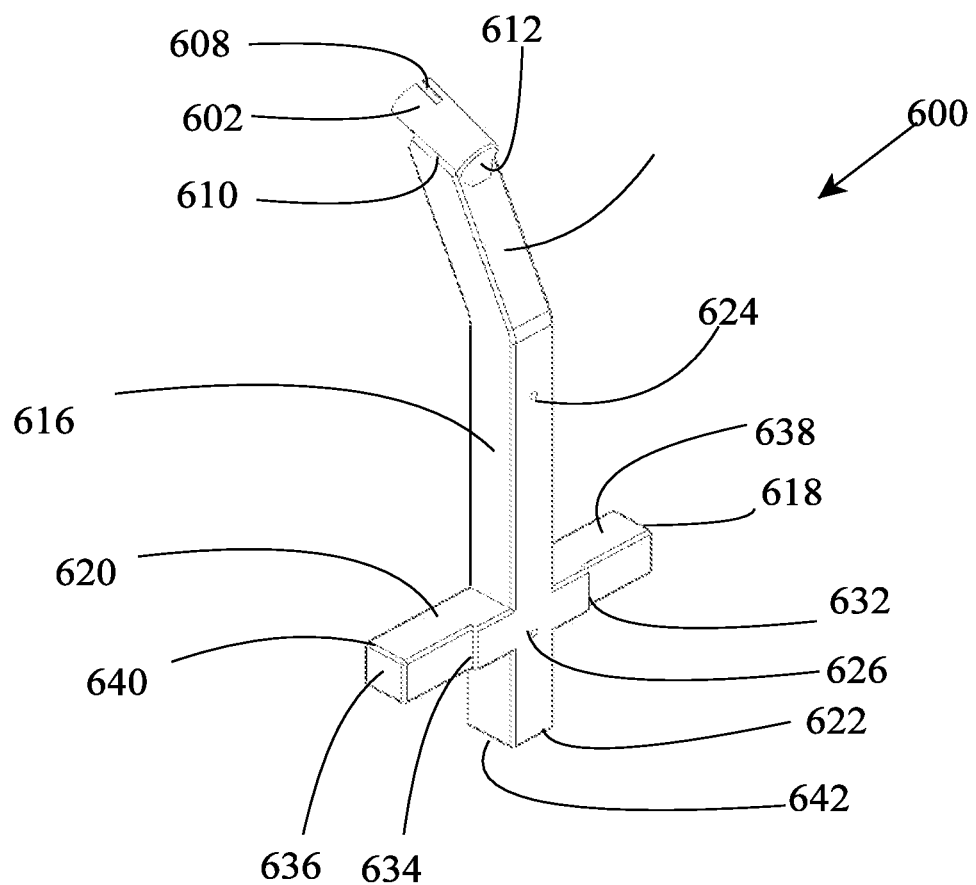
FIG. 22 is an orthogonal three-quarter view of a sixth embodiment of the invention, another core support for attachment to a bicycle seat post.
Figure 23:
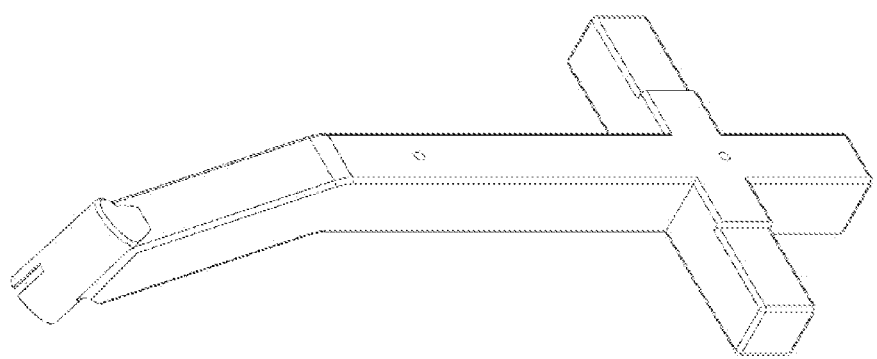
FIG. 23 is an oblique elevational side view of the sixth embodiment of the invention, showing further details of the structure of the core support.
Figure 24:
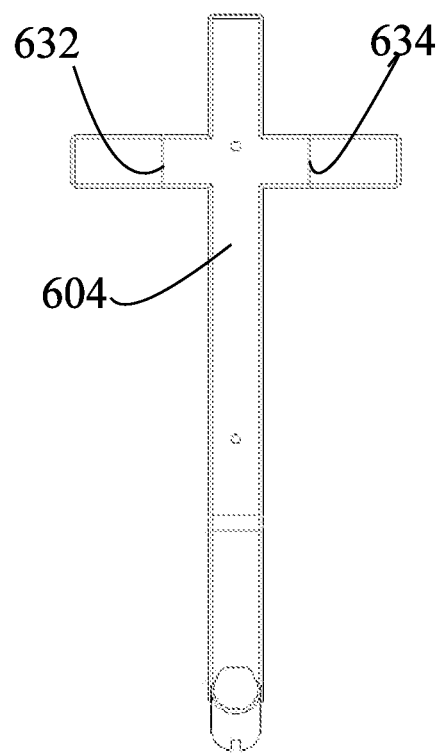
FIG. 24 is a top planform view of the sixth embodiment of the invention, a core support.

FIG. 22 is an orthogonal three-quarter view of a sixth embodiment of the invention, another core support for attachment to a bicycle seat post, FIG. 23 is an oblique elevational side view of the sixth embodiment of the invention, and FIG. 24 is a top planform view of the sixth embodiment of the invention, a core support.

In general most features of this embodiment are similar to the features seen in the first embodiment (compare to FIGS. 1 through 6) with a few exceptions which will be pointed out.

In particular, this embodiment has a core support 600, first angled central support section 614, second central support section 616 and first mating arm 618, second mating arm 620 and third mating arm 622 which are proportioned slightly differently from the first embodiment similar items (114, 116, 118, 120, 122). In particular, comparing the cross-section of these items (for example see 636 on FIG. 25 and compare to 136 on FIG. 4) it may be seen that the shape is slightly different, in this case, more rectangular.

It may also be seen that the first angled central support section 614 and the second central support section 616 are a slightly different length than comparable items 114 and 116.

Changing the cross-section of the device may improve strength or decrease weight (weight is important as the bicycle is human or electrical powered in most cases), while changing the length relative to the overall geometry is very important as the rear wheels of bicycles varies wildly in size, from bicycles with 16 inch wheels or smaller up to bicycles with 30 inch wheels or even larger. Even width may vary from bike to bike, as some have wide balloon tires for off-road work while other road bikes have narrow tires for speed and reduced wind resistance. Derailleurs may cause a rear wheel to be wider or narrower as well, at the hub.

In general, clamp 602, top support 604, clamp slot 608, fillet 610, clamp aperture 612, first securing aperture 624, second securing aperture 626, first arm step 632, second arm step 634, first arm end 638, second arm end 640 and third mating arm end 642 are comparable to the items described previously for the first embodiment, thought they may vary somewhat.

Figure 25:
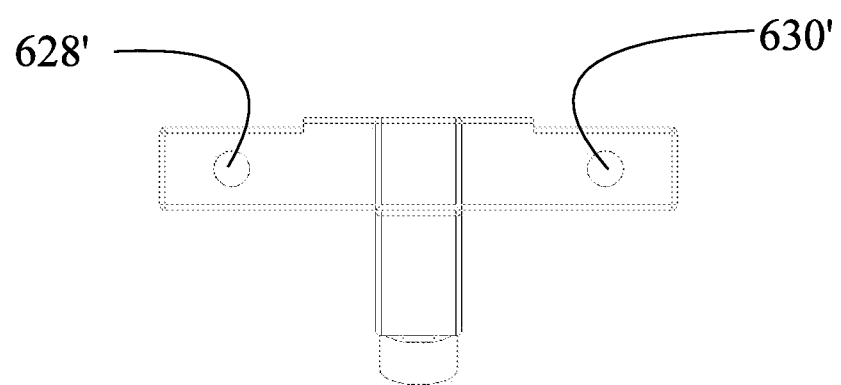
FIG. 25 is a rear (not bottom) view of the sixth embodiment of the invention, showing the "end" projecting away from the bicycle.
Figure 26:
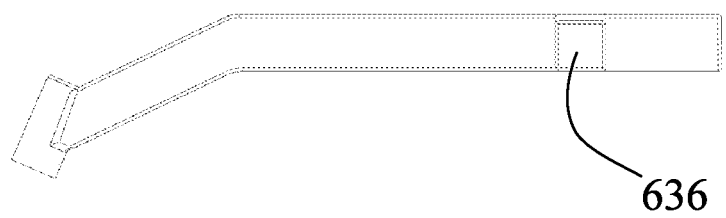
FIG. 26 is a side view of the sixth core embodiment of the invention.
Figure 27:
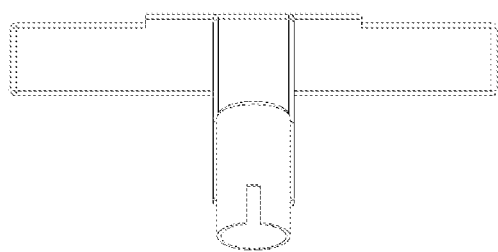
FIG. 27 is a front view of the sixth embodiment of the invention.

FIG. 25 is a rear (not bottom) view of the sixth embodiment of the invention, showing the "end" projecting away from the bicycle, FIG. 26 is a side view of the sixth core embodiment of the invention and FIG. 27 is a front view of the sixth embodiment of the invention.

In this case, the first arm bottom aperture 628' and the second arm bottom aperture 630' are not technically "bottom" apertures, as they are now disposed on the sides of the two projecting side arms and thus face (depending on choice of frame of reference) forward or backward.

Figure 28:
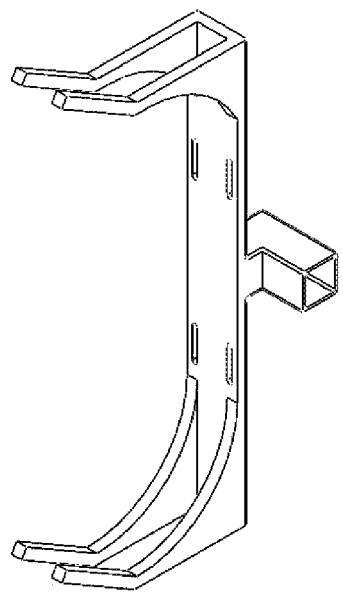
FIG. 28 is an oblique elevational side view of a seventh embodiment of the invention, a slightly different snow board holder.
Figure 29:
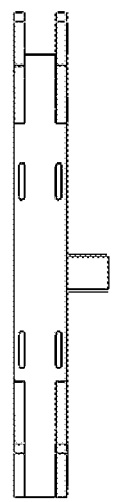
FIG. 29 is a side view of the seventh embodiment of the invention, the second snow board holder.
Figure 30:
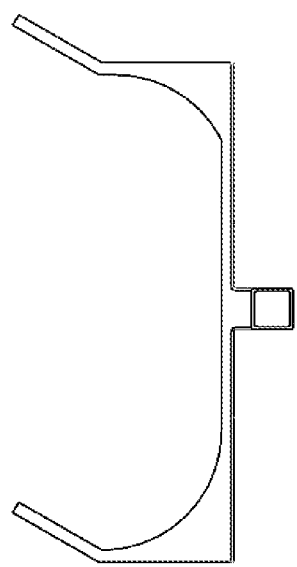
FIG. 30 is a front view of the seventh embodiment of the invention.
Figure 31:
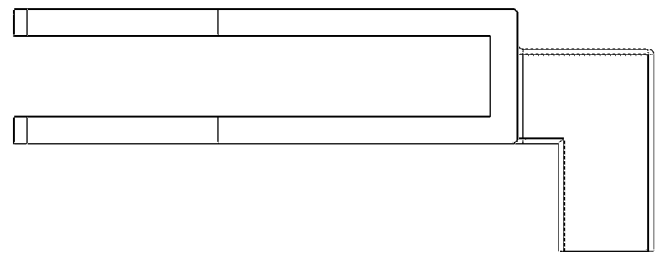
FIG. 31 is a top view of the seventh embodiment of the invention, the alternative snow board holder embodiment.
Figure 32:
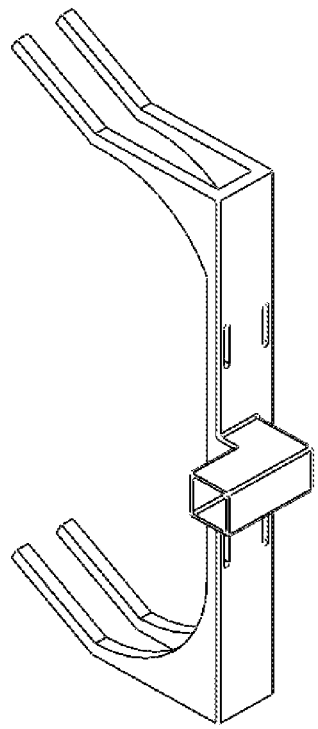
FIG. 32 is an oblique elevational reverse side view of the seventh embodiment.

FIG. 28 is an oblique elevational side view of a seventh embodiment of the invention, a slightly differently proportioned snow board holder. FIG. 29 is a side view of the seventh embodiment of the invention, the second snow board holder, showing the more compact shape. FIG. 30 is a front view of the seventh embodiment of the invention, FIG. 31 is a top view of the seventh embodiment of the invention, and FIG. 32 is an oblique elevational reverse side view.

Figure 33:
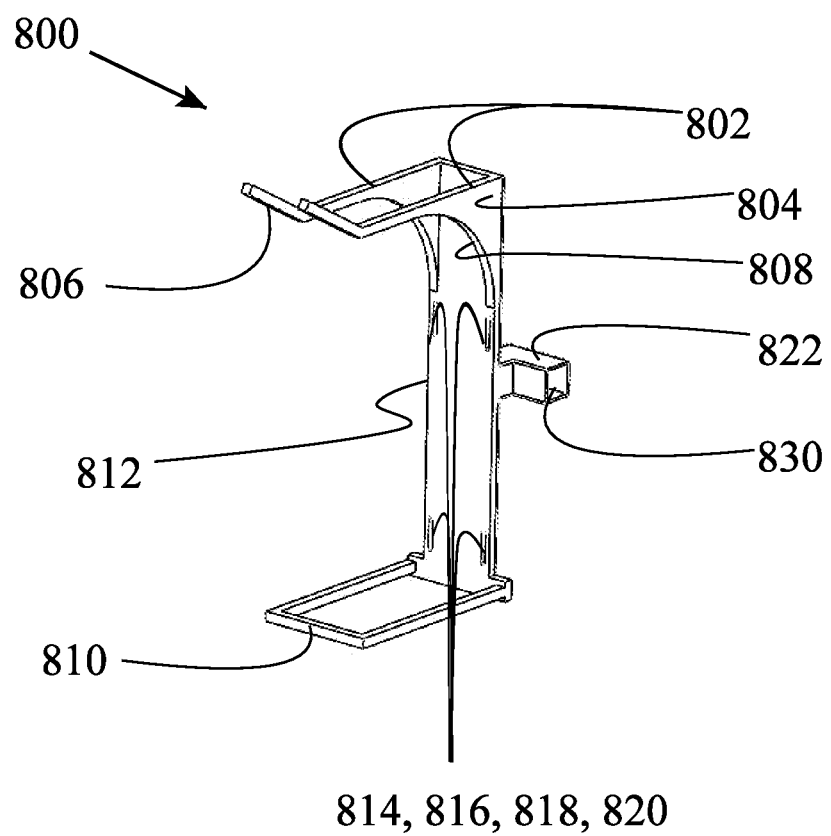
FIG. 33 is an elevational oblique view of an eighth (alternative) embodiment of the invention, another surfboard holder accessory designed to hold a surfboard.
Figure 34:
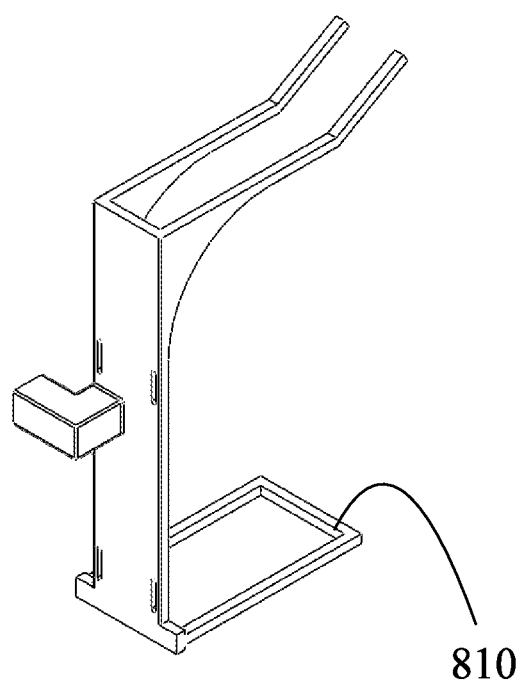
FIG. 34 is an oblique elevational reverse side view of the eighth embodiment of the invention, the surf board holder.
Figure 35:
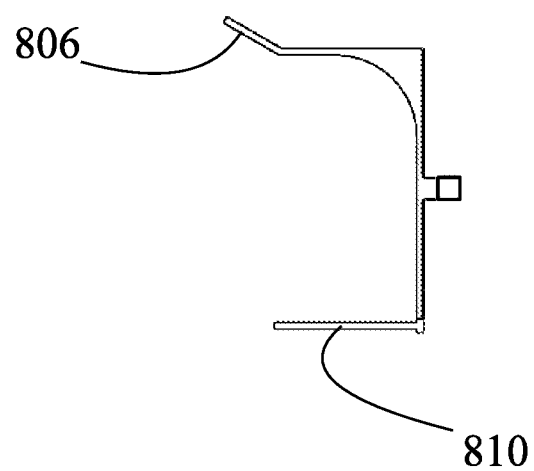
FIG. 35 is a front view of the eighth embodiment of the invention, the surf board holder.
Figure 36:
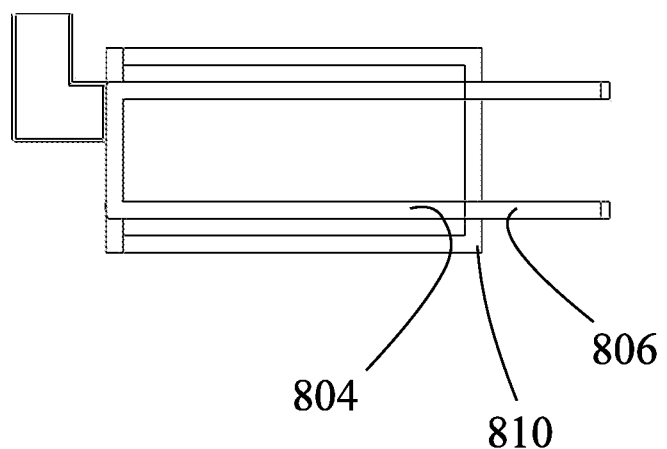
FIG. 36 is a top view of the eighth embodiment (surf board holder) of the invention.

FIG. 33 is an elevational oblique view of an eighth (alternative) embodiment of the invention, another surfboard holder accessory designed to hold a surfboard. FIG. 34 is an oblique elevational reverse side view of the eighth embodiment while FIG. 35 is a front view and FIG. 36 is a top view. Surf board holder 800 once again has first and second upper arms 802 as well as an upper arm inner section 804 and an upper arm outer section 806. While the upper arm inner section curvature 808 is similar to 308, the curvature of the third embodiment, this embodiment is different.

On FIG. 34 it may be seen that the upper arm outer section 806 projects considerably further than the angular lower U-shaped support 810.

The lower U-shaped support 810 is not curved but squared, with three members and two angles to make the three sided figure. This may be easier to manufacture or may provide better support, but may also have two sharp angles which might cause damage to objects which they hit. Note that on FIG. 36, the junction of the upper arm inner section 804 and the upper arm outer section may be seen, at approximately the same place at which the upper arms 802 occlude the angular lower U-shaped support 810, leading to the optical illusion that the arms are transparent. They may in alternative embodiments be transparent but are not so in this figure.

Vertical member 812 and strap slots 814, 816, 818, 820 may be comparable to the earlier embodiment items of FIG. 12 et seq, however the mating tube 822 may have a different mating tube interior cross-section 830 so as to match the different cross-section of the supports arms of the core member 600.

Figure 37:
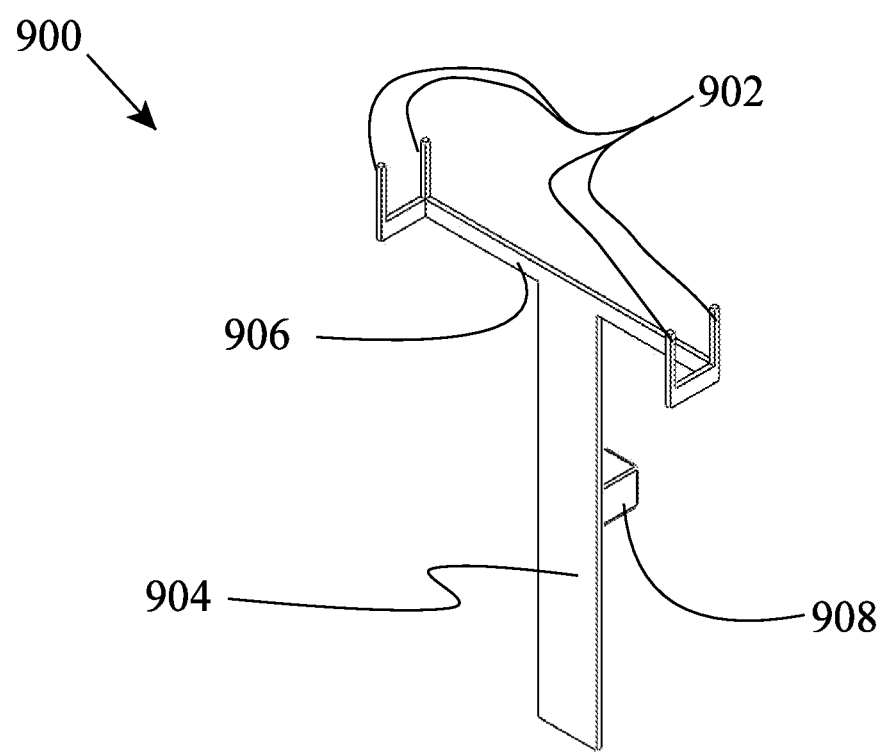
FIG. 37 is an elevational oblique rear view of the ninth embodiment of the invention.
Figure 38:
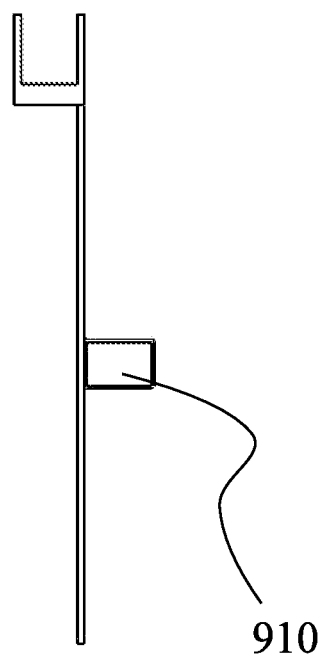
FIG. 38 is a side view of the beach chair holder—ninth embodiment of the invention—showing the projection of the mating tube.
Figure 39:
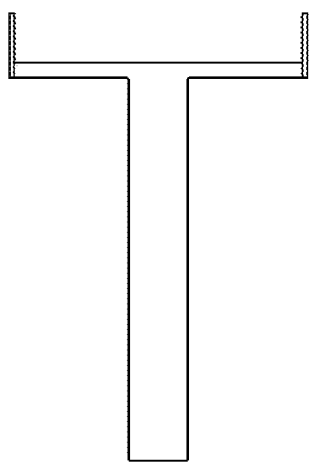
FIG. 39 is a simple rear view of the beach chair holder ninth embodiment of the invention.

FIG. 37 is an elevational oblique rear view of the ninth embodiment of the invention. FIG. 38 is a side view of the beach chair holder—ninth embodiment of the invention—showing the projection of the mating tube. FIG. 39 is a simple rear view of the beach chair holder ninth embodiment of the invention. Beach chair holder 900 has first, second, third, and fourth angular arms (902), which unlike the earlier embodiment of a beach chair holder are comprised of straight members.

Vertical support 904 is once again topped by a horizontal member 906, however, it may be seen that the simplified mating tube 908 has a mating tube cross-section 910 which matches the new embodiment rather than the old, being somewhat rectangular.

Figure 40:
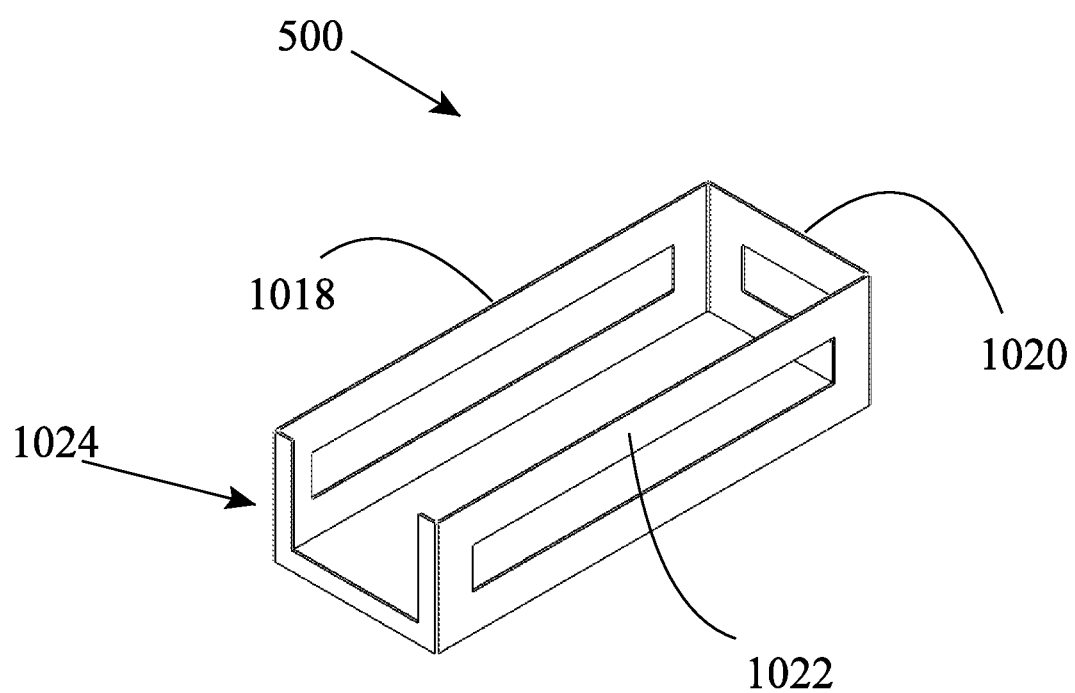
FIG. 40 is a three-quarter elevational view of an additional basket embodiment of the invention—this tenth embodiment having a fastening system similar to the fifth embodiment.
Figure 41:
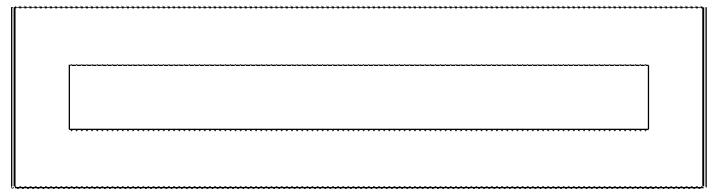
FIG. 41 is a side view of the basket (tenth) embodiment of the invention, used for carrying general and miscellaneous articles.
Figure 42:
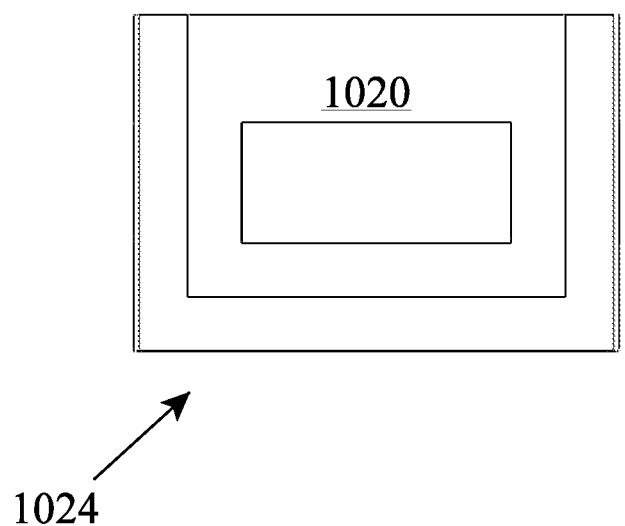
FIG. 42 is an end view of the tenth alternative embodiment of the invention.
Figure 43:
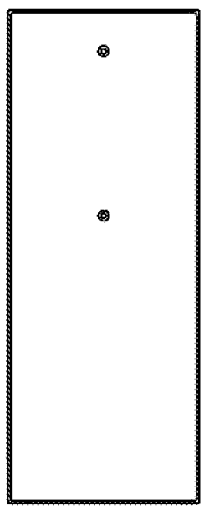
FIG. 43 is a planform top view of the tenth embodiment of the invention, providing a better view of the securing apertures.

FIG. 40 is a three-quarter elevational view of an additional basket embodiment of the invention—this tenth embodiment having a fastening system similar to the fifth embodiment, used for carrying general and miscellaneous articles. FIG. 41 is a side view of the basket, FIG. 42 is an end view of the alternative (tenth) embodiment, and FIG. 43 is a planform top view of the tenth embodiment of the invention.

Basket accessory 1000 has an open (front) end 1024 in addition to the first, second, third and fourth ends 1018, 1020, 1022. The open side allows easier access.

The open end 1024 can be mounted using the fastening apertures so that the open end 1024 is actually facing backward in the frame of reference of the bicycle. In that event longer items may be placed in the basket 1000 so that longer gear may project out backward behind the bicycle. This is one advantage of the fastening apertures over the mating tubes: the mating tubes are necessarily left or right "handed".

Figure 44:
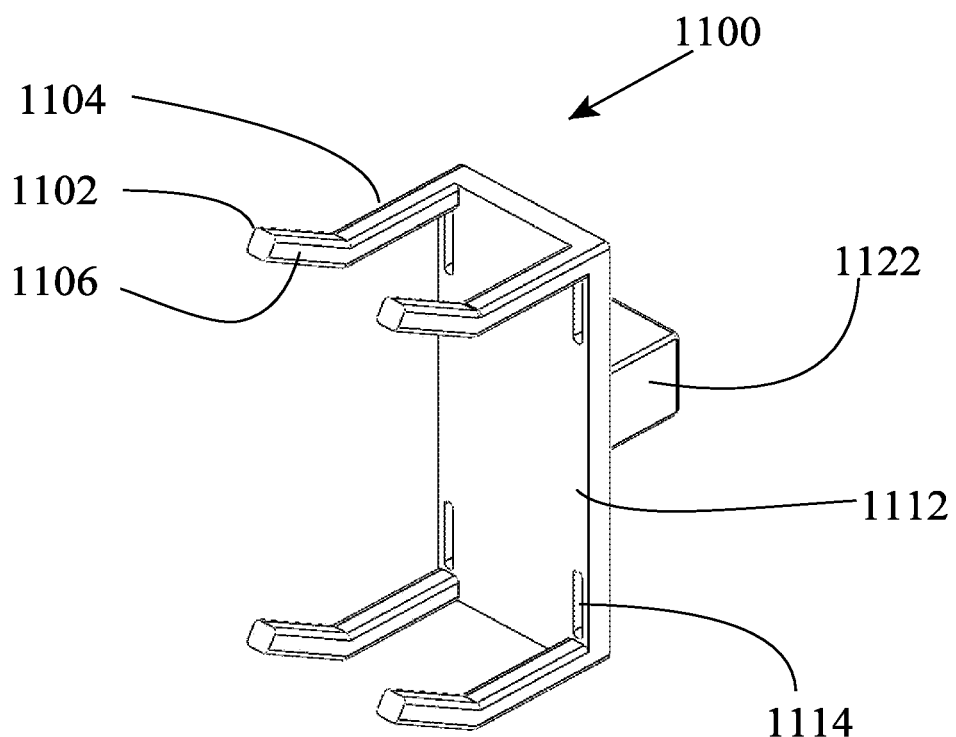
FIG. 44 is an elevational oblique view of an eleventh (alternative) embodiment of the invention, a ski holder.

FIG. 44 is an elevational oblique view of an eleventh (alternative) embodiment of the invention, a ski holder.

Ski holder 1100 is dimensioned and configured to hold skis. Any type of skis may be used, nordic, cross-country, etc. Unlike other embodiments shown previously this embodiment has four identical arms 1102 in two pairs, upper and lower.

Each identical arm 1102 has an arm inner section, 1104, which may be at a first angle to the normal: in this case, horizontal. Each identical arm 1102 also has an outer arm section 1106, which may be at a different angle to the normal, for example as shown, angled upward. The result is that the lower arms provide a valley shape for supporting the skis from underneath while the upper arms angling upward makes it easier to insert skis from the side if necessary.

Figure 45:
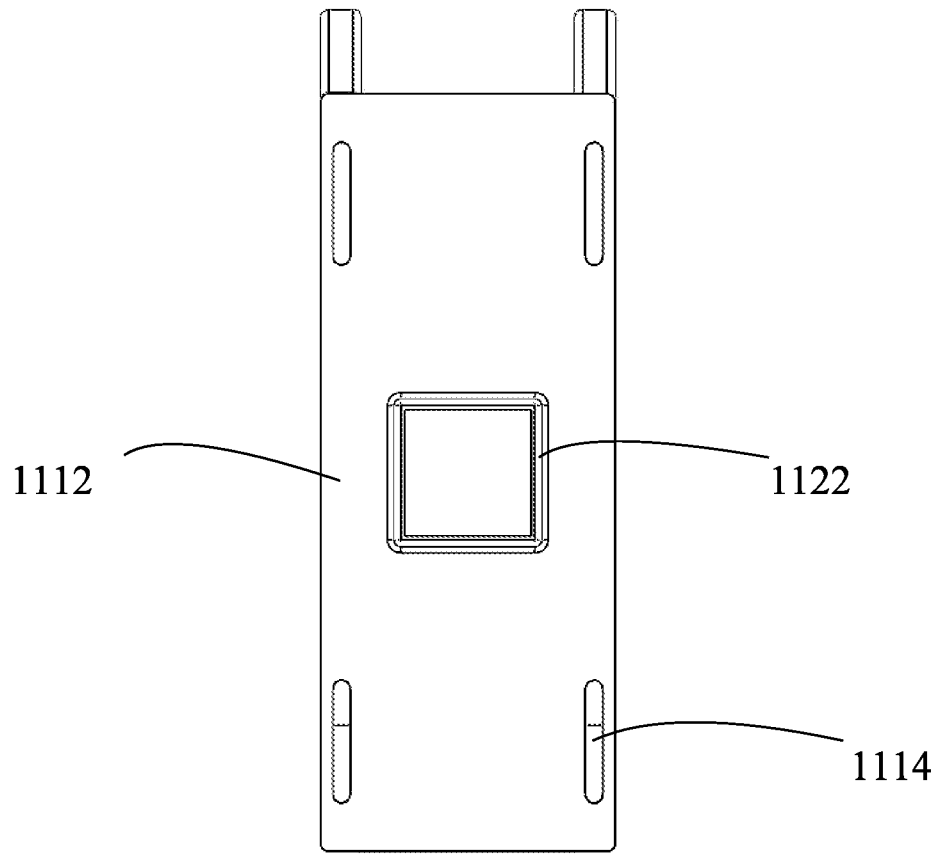
FIG. 45 is a side view of the eleventh embodiment of the invention, the ski holder.

FIG. 45 is a side view of the eleventh embodiment of the invention, the ski holder. In this view it is easy to see the vertical member 1112 and the strap slots 1114. Straps (not shown) passing through the strap slots 1114 may secure the skis on the other side and hold them tight to the vertical member 1112. It may be seen that since the strap slots 1114 are in pairs, a single strap may pass through two slots, for added economy of manufacture and use.

Mating tube 1122 may be seen end on.

Figure 46:
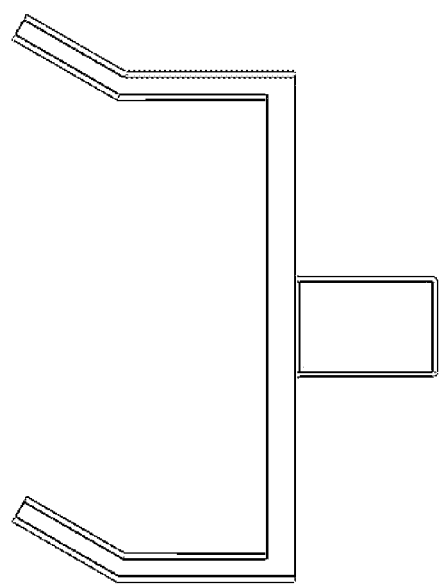
FIG. 46 is a front view of the eleventh embodiment of the invention, the ski holder.

FIG. 46 is a front view of the eleventh embodiment of the invention, the ski holder. The mating tube 1122 is seen from the side in this view. Note that small features of the arms 1102 may provide a misleading impression of hollowness. The arms 1102 may be hollow to save weight or cost, as may be the vertical member 1112 as well, however, that is not what this drawing shows.

Figure 47:
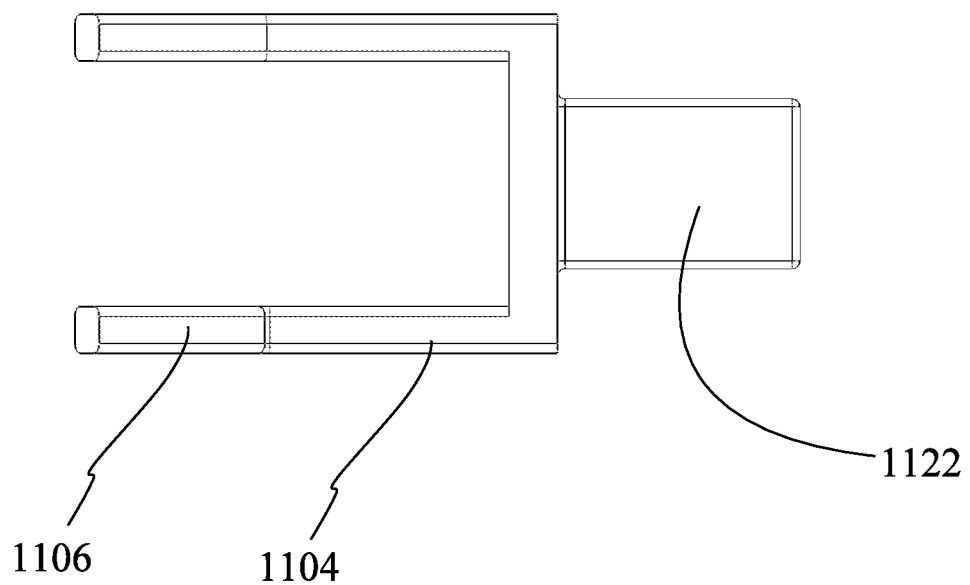
FIG. 47 is a top view of the eleventh embodiment (ski holder) of the invention.

Finally, FIG. 47 is a top view of the eleventh embodiment (ski holder) of the invention.

Note that different embodiments may be used together. For example, the basket embodiments 500 or 1000 could be used with any of the other embodiments, since they used different attachment structures. Or, a beach chair accessory (400 or 800) might be used on one side support arm 120, while the other arm 118 held some other type of support such as ski support 1100, and perhaps a basket 500 might be used in between.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

What is claimed is:

1. A bicycle carrier attachment used for carrying sporting equipment, the bicycle carrier attachment for attachment to a bicycle seat post, the bicycle carrier attachment comprising:
   a central core support, the central core support comprising:
   a tubular clamp having an aperture, the aperture having an inner diameter dimensioned and configured to encircle and attach to such bicycle seat post, the clamp having a slot dimensioned and configured to mechanically engage to part of such bicycle seat post;
   a first angled central support section projecting at a first end from the tubular clamp at an angle to the tubular clamp;

a second central support section projecting from a second end of the first angled central support section;

first and second mating arms projecting from the second central support section, the first mating arm having a first arm bottom aperture and the second mating arm having a second arm bottom aperture, the first arm having a first arm step, the first arm step creating a first arm cross-section at a first arm end, the second arm having a second arm step, the second arm step creating a second arm cross-section at a second arm end;

the first angled central support section and the second central support section being constructed of a tubing having a square cross-section;

the first and second mating arms also being constructed of the tubing having a square cross-section;

a top support running along a top surface of the first angled central support section and the second central support section, the top support being flat, the top support further partially running along the first and second mating arms and forming the first and second arm steps.

2. The bicycle carrier attachment of claim 1, further comprising:

first and second securing apertures passing vertically through the top support and the second central support section.

3. The bicycle carrier attachment of claim 2, further comprising:

a basket removably attached to the second central support section, the basket having a basket bottom;

the basket bottom having first and second basket securing apertures dimensioned and configured to align with the first and second securing apertures of the top support and the second central support section.

4. The bicycle carrier attachment of claim 3, further comprising:

an elongated planform such that the basket bottom is rectangular;

first and second tray walls extending upward from first and second opposite sides of the rectangular basket bottom;

first and second elongated apertures through the respective first and second tray walls;

third and fourth tray walls extending upward from third and fourth opposite sides of the rectangular basket bottom;

third and fourth apertures through the respective third and fourth tray walls; and an open top.

5. The bicycle carrier attachment of claim 4, further comprising:

a third mating arm projecting from the second central support section, also being constructed of the tubing having a square cross-section, the top support running along the third mating arm to a third mating arm end, but the third mating arm having no step, whereby the combination of the top support and the square cross-section causes the third mating arm to have third mating arm cross-section which is different from the first and second mating arm cross-sections.

6. The bicycle carrier attachment of claim 1, further comprising:

a snow board holder having a mating tube, the mating tube having a square-cross section dimensioned and configured to slide onto the first or second mating arm, whereby the snow board holder may be attached to the central core support;

the snow board holder having a vertical member having upper and lower ends, the mating tube projecting from the vertical member;

first and second upper arms projecting from the vertical member upper end, the first and second upper arms each having an upper arm inner section and an upper arm outer section;

the upper arm inner sections having a first curvature which transitions the upper arm inner sections to the vertical member;

third and fourth lower arms projecting from the vertical member lower end, the third and fourth lower arms each having a lower arm inner section and a lower arm outer section;

the lower arm inner sections having a second curvature which transitions the lower arm inner sections to the vertical member.

7. The bicycle carrier attachment of claim 6, further comprising:

a plurality of elongated slots.

8. The bicycle carrier attachment of claim 7, further comprising:

the lower arm outer sections having an angle above the horizontal, such that the second curvature of the lower arm inner sections and the angle above the horizontal of the lower arm outer sections cooperate to form a board edge valley.

9. The bicycle carrier attachment of claim 1, further comprising:

a surf board holder having a mating tube, the mating tube having a square-cross section dimensioned and configured to slide onto the first or second mating arm, whereby the surf board holder may be attached to the central core support;

the surf board holder having a vertical member having upper and lower ends, the mating tube projecting from the vertical member;

first and second upper arms projecting from the vertical member upper end, the first and second upper arms each having an upper arm inner section and an upper arm outer section;

the upper arm inner sections having a first curvature which transitions the upper arm inner sections to the vertical member;

a U-shaped lower support projecting from the lower end of the vertical member, the U-shaped lower support being horizontal.

10. The bicycle carrier attachment of claim 9, further comprising:

a plurality of elongated slots.

11. The bicycle carrier of claim 1, further comprising:

a beach chair holder comprising:

a vertical member having a mating tube projecting therefrom, the mating tube having a square-cross section dimensioned and configured to slide onto the first or second mating arm, whereby the beach chair holder may be attached to the central core support;

a horizontal member crossing a top end of the vertical member in a T-shape;

a plurality of brackets each having an upper opening, each attached to the horizontal member.

12. The bicycle carrier attachment of claim 1, further comprising:

a ski holder having a mating tube, the mating tube having a square-cross section dimensioned and configured to slide onto the first or second mating arm, whereby the ski holder may be attached to the central core support;

the ski holder having a vertical member having upper and lower ends, the mating tube projecting from the vertical member;

first and second upper arms projecting from the vertical member upper end, the first and second upper arms each having an upper arm inner section and an upper arm outer section;

third and fourth lower arms projecting from the vertical member lower end, the third and fourth lower arms each having a lower arm inner section and a lower arm outer section;

the four outer arm sections having an angle above the horizontal;

the four arms dimensioned and configured to support a pair of skis.

13. A bicycle carrier attachment system used for carrying sporting equipment, the bicycle carrier attachment for attachment to a bicycle seat post, the bicycle carrier attachment comprising:

a central core support;
a basket;
a snow board holder;
a surf board holder;
a beach chair holder;
the central core support comprising:
a tubular clamp having an aperture, the aperture having an inner diameter dimensioned and configured to encircle and attach to such bicycle seat post, the clamp having a slot dimensioned and configured to mechanically engage to part of such bicycle seat post;
a first angled central support section projecting at a first end from the tubular clamp at an angle to the tubular clamp;
a second central support section projecting from a second end of the first angled central support section;
first and second mating arms projecting from the second central support section, the first mating arm having a first arm bottom aperture and the second mating arm having a second arm bottom aperture, the first arm having a first arm step, the first arm step creating a first arm cross-section at a first arm end, the second arm having a second arm step, the second arm step creating a second arm cross-section at a second arm end;
the first angled central support section and the second central support section being constructed of a tubing having a square cross-section;
the first and second mating arms also being constructed of the tubing having a square cross-section;
a top support running along a top surface of the first angled central support section and the second central support section, the top support being flat, the top support further partially running along the first and second mating arms and forming the first and second arm steps;
first and second securing apertures passing vertically through the top support and the second central support section;
a third mating arm projecting from the second central support section, also being constructed of the tubing having a square cross-section, the top support running along the third mating arm to a third mating arm end, but the third mating arm having no step, whereby the combination of the top support and the square cross-section causes the third mating arm to have third mating arm cross-section which is different from the first and second mating arm cross-sections;

the basket comprising:
a basket bottom;
the basket bottom having first and second basket securing apertures dimensioned and configured to align with the first and second securing apertures of the top support and the second central support section;
an elongated planform such that the basket bottom is rectangular;
first and second tray walls extending upward from first and second opposite sides of the rectangular basket bottom;
first and second elongated apertures through the respective first and second tray walls;
third and fourth tray walls extending upward from third and fourth opposite sides of the rectangular basket bottom;
third and fourth apertures through the respective third and fourth tray walls; and
an open top;
the snow board holder comprising:
a snow board holder having a snow board holder mating tube, the snow board holder mating tube having a snow board holder square-cross section dimensioned and configured to slide onto the first or second mating arm, whereby the snow board holder may be attached to the central core support;
the snow board holder having a snow board holder vertical member having upper and lower ends, the snow board holder mating tube projecting from the snow board holder vertical member;
snow board holder first and second upper arms projecting from the snow board holder vertical member upper end, the snow board holder first and second upper arms each having a snow board holder upper arm inner section and a snow board holder upper arm outer section;
the snow board holder upper arm inner sections having a snow board holder first curvature which transitions the snow board holder upper arm inner sections to the snow board holder vertical member;
snow board holder third and fourth lower arms projecting from the snow board holder vertical member lower end, the snow board holder third and fourth lower arms each having a snow board holder lower arm inner section and a snow board holder lower arm outer section;
the snow board holder lower arm inner sections having a snow board holder second curvature which transitions the snow board holder lower arm inner sections to the snow board holder vertical member;
a plurality of snow board holder elongated slots;
the snow board holder lower arm outer sections having an angle above the horizontal, such that the snow board holder second curvature of the snow board holder lower arm inner sections and the angle above the horizontal of the snow board holder lower arm outer sections cooperate to form a board edge valley;
the surf board holder comprising:
a surf board holder mating tube, the surf board holder mating tube having a surf board holder square-cross section dimensioned and configured to slide onto the first or second mating arm, whereby the surf board holder may be attached to the central core support;
the surf board holder having a surf board holder vertical member having surf board holder upper and lower ends, the surf board holder mating tube projecting from the surf board holder vertical member;
surf board holder first and second upper arms projecting from the surf board holder vertical member upper end, the surf board holder first and second upper arms each having a surf board holder upper arm inner section and a surf board holder upper arm outer section;

the surf board holder upper arm inner sections having a surf board holder first curvature which transitions the surf board holder upper arm inner sections to the surf board holder vertical member;

a surf board holder U-shaped lower support projecting from the lower end of the surf board holder vertical member, the surf board holder U-shaped lower support being horizontal;

a plurality of surf board holder elongated slots; and the beach chair holder comprising:

a beach chair holder vertical member having a beach chair holder mating tube projecting therefrom, the beach chair holder mating tube having a beach chair holder square-cross section dimensioned and configured to slide onto the first or second mating arm, whereby the beach chair holder may be attached to the central core support;

a beach chair holder horizontal member crossing a top end of the beach chair holder vertical member in a T-shape;

a plurality of beach chair holder semicircular brackets each having a beach chair holder upper opening, each attached to the beach chair holder horizontal member.

\* \* \* \* \*